US010805907B2

(12) United States Patent
Lin et al.

(10) Patent No.: US 10,805,907 B2
(45) Date of Patent: Oct. 13, 2020

(54) METHOD AND APPARATUS FOR RECEIVING CONTROL CHANNEL FOR MULTIPLE NUMEROLOGIES IN A WIRELESS COMMUNICATIONS SYSTEM

(71) Applicant: ASUSTeK COMPUTER INC., Taipei (TW)

(72) Inventors: Ko-Chiang Lin, Taipei (TW); Ming-Che Li, Taipei (TW)

(73) Assignee: ASUSTek Computer Inc., Taipei (TW)

(*) Notice: Subject to any disclaimer, the term of this patent is extended or adjusted under 35 U.S.C. 154(b) by 0 days.

(21) Appl. No.: 15/721,136

(22) Filed: Sep. 29, 2017

(65) Prior Publication Data
US 2018/0098312 A1 Apr. 5, 2018

Related U.S. Application Data

(60) Provisional application No. 62/402,292, filed on Sep. 30, 2016, provisional application No. 62/414,341, filed on Oct. 28, 2016, provisional application No. 62/421,572, filed on Nov. 14, 2016.

(51) Int. Cl.
H04W 72/04 (2009.01)
H04L 5/00 (2006.01)
H04L 1/18 (2006.01)

(52) U.S. Cl.
CPC ....... *H04W 72/0406* (2013.01); *H04L 1/1861* (2013.01); *H04L 5/0007* (2013.01); *H04L 5/0044* (2013.01); *H04L 5/0053* (2013.01)

(58) Field of Classification Search
CPC ... H04L 1/1861; H04L 5/0007; H04L 5/0044; H04L 5/0053; H04W 72/0406
See application file for complete search history.

(56) References Cited

U.S. PATENT DOCUMENTS

| 8,902,861 | B2* | 12/2014 | Wei | H04L 1/0025 |
| | | | | 370/336 |
| 10,045,345 | B2* | 8/2018 | Ma | H04L 1/1812 |
| 10,225,065 | B2* | 3/2019 | Ang | H04L 5/003 |
| 10,548,129 | B2* | 1/2020 | Fwu | H04W 72/044 |
| 2008/0039133 | A1 | 2/2008 | Ma et al. | |

(Continued)

FOREIGN PATENT DOCUMENTS

| TW | 428403 B | 4/2001 |
| TW | I323102 B | 4/2010 |

(Continued)

OTHER PUBLICATIONS

European Office Action and Search Report for European Patent Application No. 17194081.0 dated Jan. 31, 2018, 14 pages.

(Continued)

*Primary Examiner* — Phuc H Tran
(74) *Attorney, Agent, or Firm* — Cooper Legal Group, LLC

(57) ABSTRACT

Techniques for receiving control channel for multiple numerologies are disclosed. The UE receives a control channel by using a first numerology and receives a first data channel information by using a second numerology. The UE also receives a second data channel information by using the first numerology. Also, different numerologies and bandwidth portions are used for communicating data channel information and HARQ feedback respectively.

20 Claims, 18 Drawing Sheets

(56) References Cited

U.S. PATENT DOCUMENTS

| | | | |
|---|---|---|---|
| 2010/0061345 | A1 | 3/2010 | Wengerter |
| 2010/0111005 | A1* | 5/2010 | Ahn .................. H04L 5/0007 370/329 |
| 2017/0181149 | A1* | 6/2017 | Ang .................. H04L 5/003 |
| 2017/0311315 | A1* | 10/2017 | Islam ............... H04W 56/0015 |
| 2017/0325256 | A1* | 11/2017 | Islam .................. H04L 1/08 |
| 2018/0049047 | A1* | 2/2018 | Lin .................. H04W 24/02 |
| 2018/0049064 | A1* | 2/2018 | Li .................. H04W 28/10 |
| 2018/0054848 | A1* | 2/2018 | Yoo .................. H04W 76/25 |
| 2018/0070341 | A1* | 3/2018 | Islam .................. H04L 1/1887 |
| 2018/0199341 | A1* | 7/2018 | Baldemair .......... H04L 27/264 |
| 2018/0234998 | A1* | 8/2018 | You .................. H04W 72/042 |
| 2019/0045506 | A1* | 2/2019 | Takeda .............. H04W 72/0446 |
| 2019/0149283 | A1* | 5/2019 | Tang .................. H04L 5/0092 375/267 |

FOREIGN PATENT DOCUMENTS

| | | |
|---|---|---|
| TW | I407715 B | 9/2013 |
| TW | I432066 B | 3/2014 |
| WO | 2011/139063 A2 | 11/2011 |

OTHER PUBLICATIONS

"Discussion on the Multiplexing of Different Numerologies," 3GPP TSG-RAN WGI Meeting 85, May 2016, R1-164985, Panasonic, Nanjing, China, 6 pages. http://www.3gpp.org/ftp/tsg_ran/WG1_RL1/TSGR1_85/Docs/.

"Considerations on Initial Access Design," 3GPP TSG RAN WGI Meeting #86, Aug. 2016, R1-166586, Xinwei, Gothenburg, Sweden, 6 pages. http://www.3gpp.org/ftp/tsg_ran/WG1_RL1/TSGR1_86/Docs/.

Ericsson, "SI: Study on Latency reduction techniques for LTE," 3GPP TSG RAN Meeting #67, Mar. 2015, RP-150465, Shanghai, China, 8 pages.

"Study on Latency Reduction Techniques for LTE," 3rd Generation Partnership Project, Technical Specification Group Radio Access Network, Evolved Universal Terrestrial Radio Access (E-UTRA), 3GPP TR 36.811, Feb. 2016, 92 pages.

"Physical Channels and Modulation," 3rd Generation Partnership Project, Technical Specification Group Radio Access Network, Evolved Universal Terrestrial Radio Access (E-UTRA), 3GPP TS 36.211, Mar. 2016, V13.1.0, 155 pages.

"Multiplexing and Channel Coding," 3rd Generation Partnership Project, Technical Specification Group Radio Access Network, Evolved Universal Terrestrial Radio Access (E-UTRA), 3GPP TS 36.212, Mar. 2016, V13.1.0, 129 pages.

"Physical Layer Procedures," 3rd Generation Partnership Project, Technical Specification Group Radio Access Network, Evolved Universal Terrestrial Radio Access (E-UTRA), 3GPP TS 36.213, Mar. 2016, V13.1.1, 361 pages.

Taiwanese Office Action and Search Report for Taiwanese Patent Application No. 106133831 dated Oct. 24, 2018, 6 pages.

Japanese Office Action and Search Report for Japanese Patent Application No. 2017-189915 dated Nov. 13, 2018, 12 pages (including English translation).

Etri, "On design of mixed numerology in a NR carrier," 3GPP TSG RAN WG1 Meeting #86, R1-166941, Aug. 2016, Gothenburg, Sweden, 5 pages.

Interdigital Communications, "UE Support for Multiple Numerologies with NR," 3GPP TSG-RAN WG2 #95, R2-165055, Aug. 2016, Goteborg, Sweden, 4 pages.

Intel Corporation, "Capability to support multiple numerologies," 3GPP TSG RAN WG1 Meeting #86, R1-166554, Aug. 2016, Gothenburg, Sweden, 4 pages.

Mediatek Inc., "Flexible Frame Structure for New Radio Access Technology," 3GPP TSG RAN WG1 Meeting #86 R1-167522, Aug. 2016, Gothenburg, Swedenn, 4 pages.

Panasonic, R1-164985, Discussion on the multiplexing of different numerologies, 3GPP TSG RAN WG1 #85, 3GPP (server publication date: May 13, 2016) End.

Korean Office Action dated Jan. 9, 2019 for Korean Application No. 10-2017-0127715, 6 pages.

"Discussion on the multiplexing of different numerologies", May 2016; Panasonic; 3GPP TSG-RAN WG1 Meeting 85; R1-164985; Draft; R1-164985, 3rd Generation Partnership Project, Mobile Competence Centre; vol. RAN WG1, No. Nanjing, China; Retrieved from the Internet: URL:http://www.3gpp.org/ftp/tsg_ran/WG1_RL1/TSGR1_85/Docs/ 6 pgs.

Indian Office Action from corresponding in Application No. 201714034648 dated Feb. 14, 2020, 6 pgs.

Panasonic—"Discussion on the multiplexing of different numerologies" 3GPP Draft, TDocs: R1-164985, (3GPP TSG-RAN WG1 Meeting—85) Retrieved from: https://portal.3gpp.org/#/55931-tdocs.

* cited by examiner

METHOD AND APPARATUS FOR RECEIVING CONTROL CHANNEL FOR MULTIPLE NUMEROLOGIES IN A WIRELESS COMMUNICATIONS SYSTEM

CROSS-REFERENCE TO RELATED APPLICATIONS

This application claims the benefit of U.S. Provisional Application Ser. No. 62/402,292, filed Sep. 30, 2016, and entitled "METHOD AND APPARATUS FOR TRANSMITTING CONTROL CHANNEL FOR MULTIPLE NUMEROLOGIES IN A WIRELESS COMMUNICATION SYSTEM," the entirety of which is expressly incorporated herein by reference.

This application also claims the benefit of U.S. Provisional Application Ser. No. 62/414,341, filed Oct. 28, 2016, and entitled "METHOD AND APPARATUS FOR TRANSMITTING HARQ ACKNOWLEDGEMENT FOR MULTIPLE NUMEROLOGIES IN A WIRELESS COMMUNICATION SYSTEM" the entirety of which is expressly incorporated herein by reference.

This application also claims the benefit of U.S. Provisional Application Ser. No. 62/421,572, filed Nov. 14, 2016, and entitled "METHOD AND APPARATUS FOR CONTROL CHANNEL TRANSMISSION FOR MULTIPLE NUMEROLOGIES IN A WIRELESS COMMUNICATION SYSTEM" the entirety of which is expressly incorporated herein by reference.

TECHNICAL FIELD

The subject disclosure relates generally to communications systems, and specifically to efficiently transmitting controls channels in a wireless communications system that uses multiple numerologies.

BACKGROUND 5G, the next telecommunications standard, will likely use the signal modulation format known as orthogonal frequency divisional multiplexing (OFDM). The new radio access technologies (NR), on which the 5G radio access will be built, will provide networks that support multiple numerologies. Numerology refers to the particular parameters that are selected for performing a given OFDM communication including, for example, subcarrier spacing, symbol duration, cyclic prefix and resource block size. The simultaneous usage of multiple numerologies will allow the NR networks to communicate at higher data rates and lower latencies than is presently possible. However, mobile devices are expected to vary in their capabilities in accommodating the different numerologies offered by a given network. The 3rd Generation Partnership Project (3GPP), which provides reference designs and identifies issues that require consideration and solutions for 5G, has noted that there are unresolved issues related to resource allocation, resource control and transmitting control channel information for 5G systems that use multiple numerologies. Inventions presented in the subject disclosure provide solutions to those issues including, for example, methodology for efficiently transmitting control channel information for a cell that supports multiple numerologies.

SUMMARY

Method and apparatus for receiving a control channel by a user equipment (UE) in a wireless communication system are disclosed herein. The UE is configured to use a first numerology for receiving a control channel. Also, the UE receives information regarding using a second numerology for receiving a first data channel. The UE receives the control channel by using the first numerology and receives the first data channel by using the second numerology.

BRIEF DESCRIPTION OF THE DRAWINGS

Various non-limiting embodiments are further described with reference to the accompanying drawings in which.

DETAILED DESCRIPTION

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Figure 1:
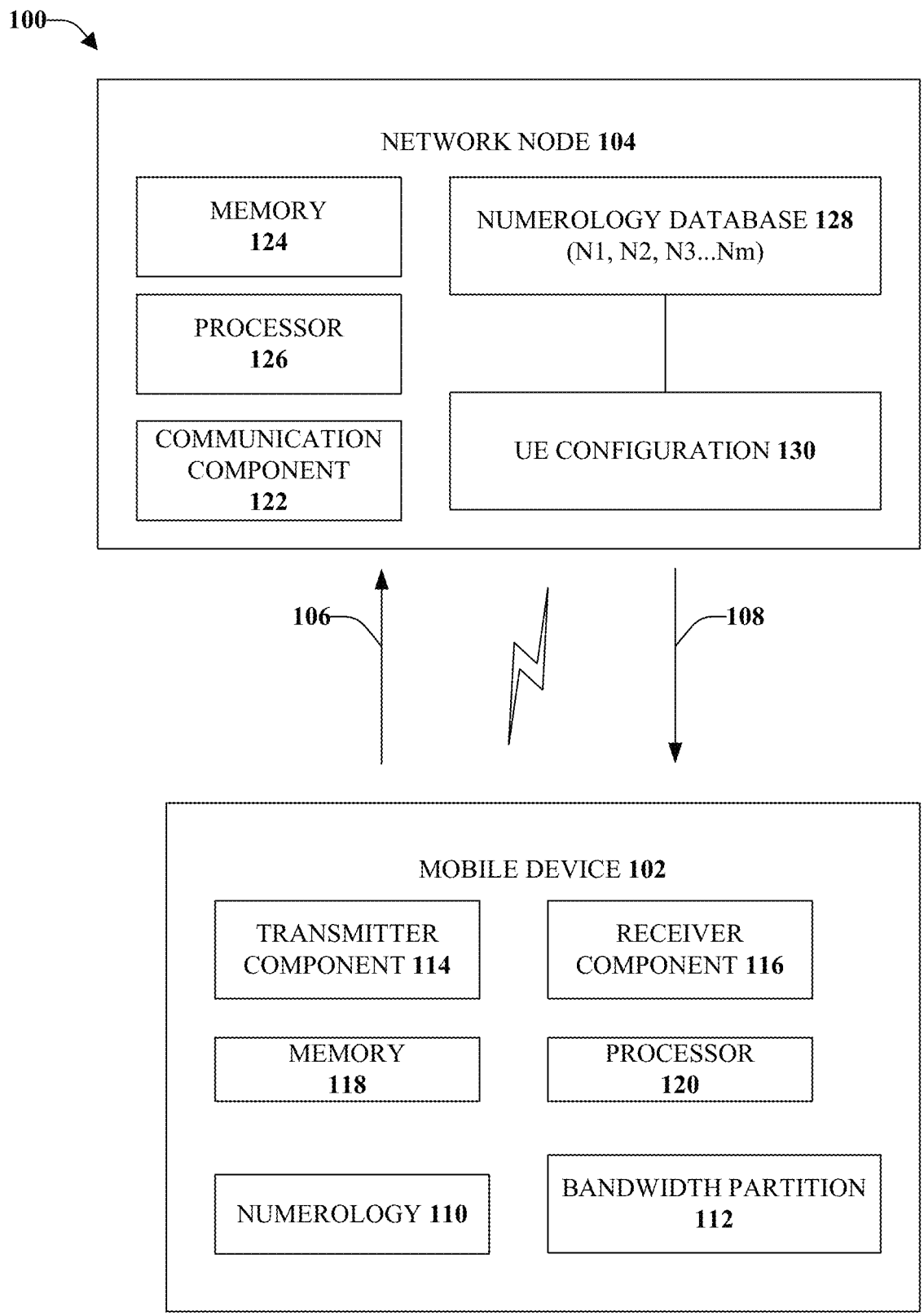
FIG. 1 illustrates an example, non-limiting wireless communications system for transmitting control channel information, in accordance with one or more embodiments described herein.

Referring initially to FIG. 1 illustrated is an example, non-limiting wireless communications system 100 including a mobile device (or UE) 102 and a network 104, for configuring the mobile device 102 for using multiple numerologies, appropriate control channels and partitioned bandwidths, in accordance with one or more embodiments described herein. As illustrated, a user equipment (UE) or mobile device 102 (e.g., mobile device or other terminology) can be in communication with a network node 104 (e.g., an eNodeB, eNB, network, cell or other terminology). Further, the mobile device 102 and/or the network node 104 can be in communication with other mobile devices (not shown) and/or other network nodes (not shown). A "link" is a communications channel that connects two or more devices or nodes. An uplink (UL 106) refers to a link used for transmission of signals from the mobile device 102 to the network node 104. A downlink (DL 108) refers to the link used for transmission of signals from the network node 104 to the mobile device 102. It is noted that although various aspects are discussed with respect to a single mobile device and a single network node, the various aspects discussed herein can be applied to one or more mobile devices and/or one or more network nodes.

The mobile device 102 can include a numerology component 110, a bandwidth partition component 112, a transmitter component 114, and a receiver component 116. Although illustrated and described with respect to separate components, the transmitter component 114 and the receiver component 116 can be a single transmitter/receiver configured to transmit to and/or receive data to/from the network node 104, other network nodes, and/or other Mobile devices. Through the transmitter component 114 and the receiver component 116, the mobile device 102 can concurrently transmit and receive data, the mobile device 102 can transmit and receive data at different times, or combinations thereof.

According to some implementations, the mobile device 102 can include a control circuit and the processor 120 and the memory 118 can be installed on the control circuit. Further, the processor 120 can be configured to execute a program code stored in the memory 118 to perform the various aspects discussed herein and especially with respect to the methodologies illustrated in FIGS. 3-12. For example, the processor 120 can execute the program code in the memory 118 to select numerologies to be used for various transmissions (e.g. transmissions via control channels and data channels) and to apportion partitioned bandwidths for those transmissions. The functionality of the numerology component 110 and the bandwidth partition component 112 is described in this disclosure with reference to various methodologies.

In the example shown in FIG. 1, the numerology component 110 contains only one numerology or multiple numerologies. In various embodiments, numerologies can be added or removed from the numerology component 110. Numerology refers to the particular values that are selected for parameters such as subcarrier spacing, symbol times, Fast Fourier Transform (FFT) sizes, etc. for performing orthogonal frequency division multiplexing (OFDM). That is the case in some Long Term Evolution (LTE) complaint mobile phones, wherein only one downlink (DL) numerology is defined for initial access. Specifically, the numerology is defined to include a 15 KHz subcarrier spacing and the signal and channel to be acquired during initial access are based on 15 KHz numerology. The OFDM symbols are grouped into resource blocks. If the resource blocks have a total size of 180 kHz spacing in the frequency domain, for example, then at 15 kHz sub-spacing there would be 12 subcarriers. In time domain, each resource block would have the length of 5 milliseconds and thus each 1 millisecond transmission time interval (TTI) would transmit two slots (Tslots) of OFDM symbols.

Figure 2:
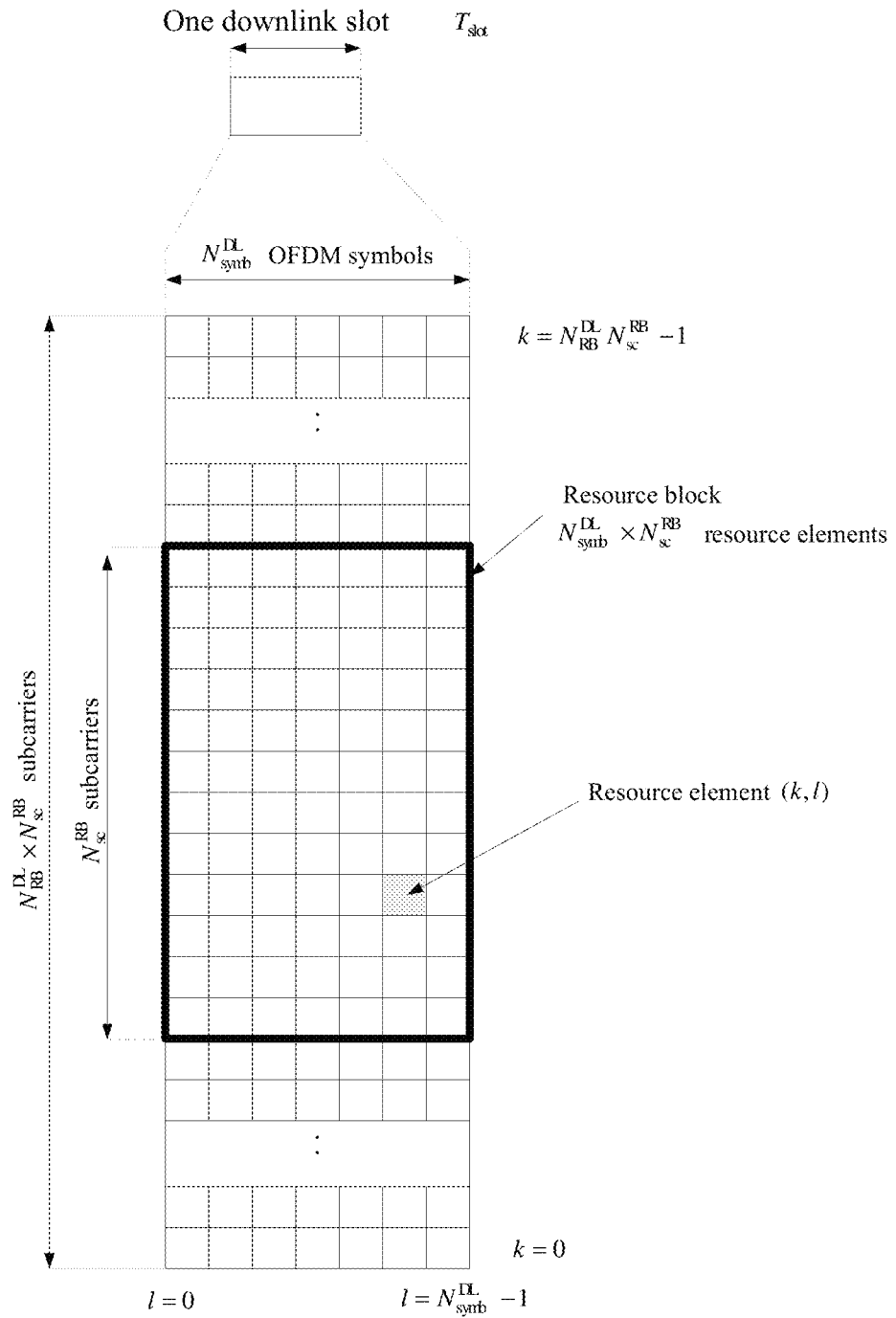
FIG. 2 illustrates an example, non-limiting downlink resource grid for OFDM transmission, in accordance with one or more embodiments described herein.

An overview of the LTE numerology and descriptions of the OFDM resource grid, the resource elements and the resource blocks are described in 3GPP TS 36.211 v13.1.10 ("E-ULTA physical channels and modulation (Release 13)") in sections 6.1 and 6.2. 3GPP Ts 36.211 v13.1.10 is incorporated by reference here in its entirety and some portions are reproduced below and in FIG. 2.

Figure 6:
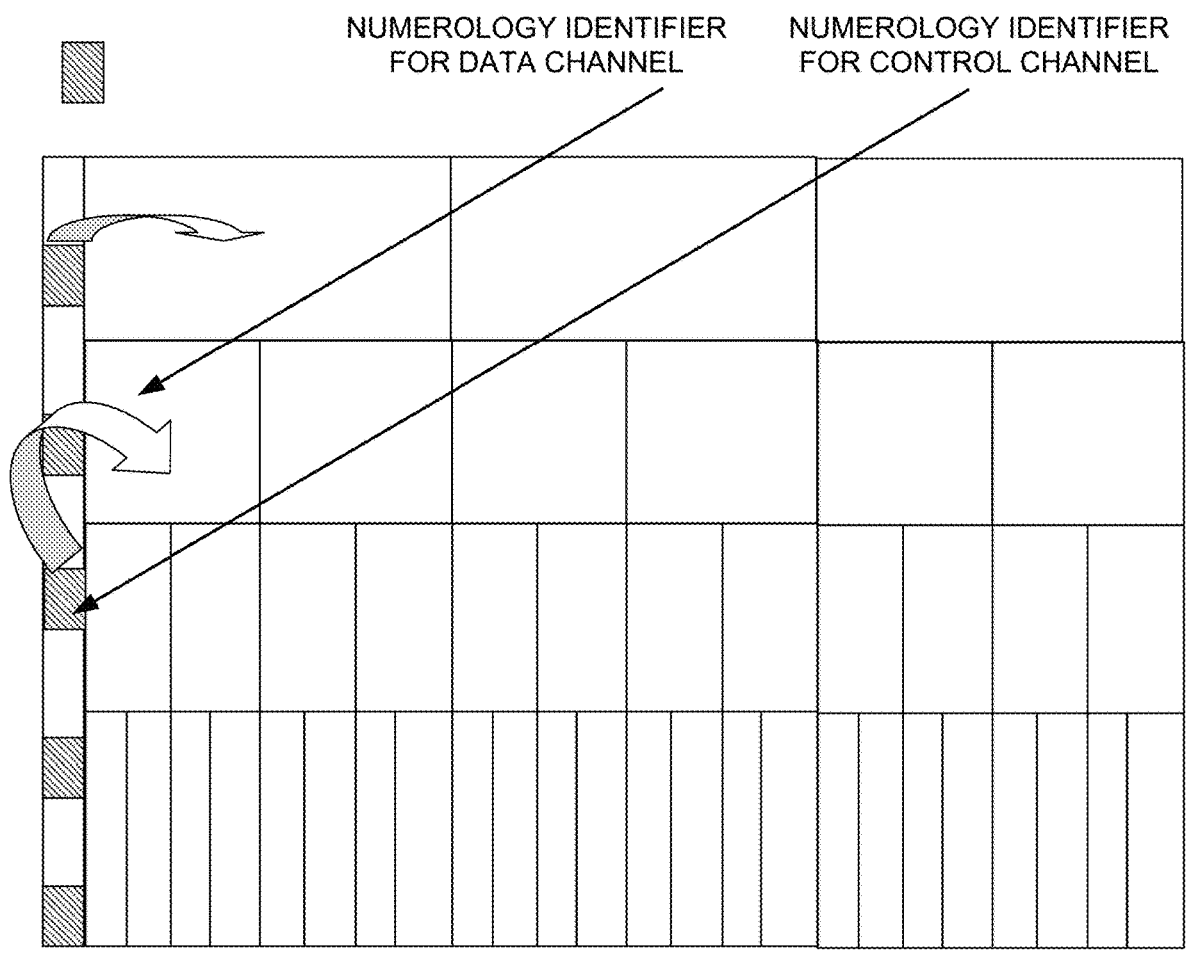
FIG. 6 illustrates an example, non-limiting methodology in which a control channel with a specific (given) numerology schedules a data channel with a different numerology, in accordance with one or more embodiments described herein.

"6.2.1 Resource grid: The transmitted signal in each slot is described by one or several resource grids of $N_{RB}^{DL}$ $N_{sc}^{RB}$ subcarriers and $N_{symb}^{DL}$ OFDM symbols. The resource grid structure is illustrated in FIG. 6.2.2-1. [Reproduced in FIG. 2] The quantity $N_{RB}^{DL}$ depends on the downlink transmission bandwidth configured in the cell and shall fulfill $$N_{RB}^{min,DL} \leq N_{RB}^{DL} \leq N_{RB}^{max,DL}$$

where $N_{RB}^{min,DL}=6$ and $N_{RB}^{max,DL}=110$ are the smallest and largest downlink bandwidths, respectively, supported by the current version of this specification.

The set of allowed values for $N_{RB}^{DL}$ is given by 3GPP TS 36.104 [6]. The number of OFDM symbols in a slot depends on the cyclic prefix length and subcarrier spacing configured and is given in Table 6.2.3-1 [reproduced below].

An antenna port is defined such that the channel over which a symbol on the antenna port is conveyed can be inferred from the channel over which another symbol on the same antenna port is conveyed. For MBSFN [multicast-broadcast single-frequency network] reference signals, positioning reference signals, UE-specific reference signals associated with PDSCH [physical downlink shared channel] and demodulation reference signals associated with EPDCCH [enhanced physical downlink control channel], there are limits given below within which the channel can be inferred from one symbol to another symbol on the same antenna port. There is one resource grid per antenna port. The set of antenna ports supported depends on the reference signal configuration in the cell:

Cell-specific reference signals support a configuration of one, two, or four antenna ports and are transmitted on antenna ports p=0, p∈{0,1}, and p∈{0,1,2,3}, respectively.

MBSFN reference signals are transmitted on antenna port p=4. The channel over which a symbol on antenna port p=4 is conveyed can be inferred from the channel over which another symbol on the same antenna port is conveyed only if the two symbols correspond to subframes of the same MBSFN area.

UE-specific reference signals associated with PDSCH are transmitted on antenna port(s) p=5, p=7, p=8, or one or several of p∈{7,8,9,10,11,12,13,14}. The channel over which a symbol on one of these antenna ports is conveyed can be inferred from the channel over which another symbol on the same antenna port is conveyed only if the two symbols are within the same subframe and in the same PRG when PRB bundling is used or in the same PRB pair when PRB bundling is not used.

Demodulation reference signals associated with EPDCCH are transmitted on one or several of p∈{107,108,109,110}. The channel over which a symbol on one of these antenna ports is conveyed can be inferred from the channel over which another symbol on the same antenna port is conveyed only if the two symbols are in the same PRB pair.

Positioning reference signals are transmitted on antenna port p=6. The channel over which a symbol on antenna port p=6 is conveyed can be inferred from the channel over which another symbol on the same antenna port is conveyed only within one positioning reference signal occasion consisting of $N_{PRS}$ consecutive downlink subframes, where $N_{PRS}$ is configured by higher layers.

CSI reference signals support a configuration of one, two, four, eight, twelve, or sixteen antenna ports and are transmitted on antenna ports p=15, p=15,16, p=15, . . . , 18, p=15, . . . , 22, p=15, . . . , 26 and p=15, . . . , 30, respectively.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, and average delay."

"6.2.2 Resource elements: Each element in the resource grid for antenna port p is called a resource element and is uniquely identified by the index pair (k,l) in a slot where k=0, . . . , $N_{RB}^{DL}N_{sc}^{RB}-1$ and l=0, . . . , $N_{symb}^{DL}-1$ are the indices in the frequency and time domains, respectively. Resource element (k,l) on antenna port p corresponds to the complex value $a_{k,l}^{(p)}$. When there is no risk for confusion, or no particular antenna port is specified, the index p may be dropped." [See FIG. 2].

"6.2.3 Resource blocks: Resource blocks are used to describe the mapping of certain physical channels to resource elements. Physical and virtual resource blocks are defined.

A physical resource block is defined as $N_{symb}^{DL}$ consecutive OFDM symbols in the time domain and $N_{sc}^{RB}$ consecutive subcarriers in the frequency domain, where $N_{symb}^{DL}$ and $N_{sc}^{RB}$ are given by Table 6.2.3-1. A physical resource block thus consists of $N_{symb}^{DL} \times N_{sc}^{RB}$ resource elements, corresponding to one slot in the time domain and 180 kHz in the frequency domain.

Physical resource blocks are numbered from 0 to $N_{RB}^{DL}-1$ in the frequency domain.

The relation between the physical resource block number $n_{PRB}$ in the frequency domain and resource elements (k,l) in a slot is given by $$n_{PRB} = \left\lfloor \frac{k}{N_{sc}^{RB}} \right\rfloor$$

TABLE 6.2.3-1

Physical resource blocks parameters

| Configuration | | $N_{sc}^{RB}$ | $N_{symb}^{DL}$ |
|---|---|---|---|
| Normal cyclic prefix | Δf = 15 kHz | 12 | 7 |
| Extended cyclic prefix | Δf = 15 kHz | | 6 |
| | Δf = 7.5 kHz | 24 | 3 |

A physical resource-block pair is defined as the two physical resource blocks in one subframe having the same physical resource-block number $n_{PRB}$.

A virtual resource block is of the same size as a physical resource block. Two types of virtual resource blocks are defined:
  Virtual resource blocks of localized type
  Virtual resource blocks of distributed type
For each type of virtual resource blocks, a pair of virtual resource blocks over two slots in a subframe is assigned together by a single virtual resource block number, $n_{VRB}$."

The network node 104 can include a communication component 122 that can be a transmitter/receiver configured to transmit to and/or receive data from the mobile device 102, other network nodes, and/or other mobile devices. Through the communication component 122, the network node 104 can concurrently transmit and receive data, the network node 104 can transmit and receive data at different times, or combinations thereof. The network node 104 can also comprise a memory 124 operatively coupled to a processor 126. The memory 124 can facilitate action to control communication between the network node 104 and the mobile device 102, such that the non-limiting communications system 100 can employ stored protocols and/or algorithms to achieve improved communications in a wireless network as described herein.

The network node 104 includes a numerology database (or library) 128 and a UE configuration module 130 communicably and/or controllably coupled to the numerology database 128. The numerology database 128 includes numerologies N1-Nm that the network node 104 can process. In one embodiment, one of the numerologies N1-Nm is the default numerology. In one embodiment, one of the numerologies N1-Nm is the network node's 104 preferred numerology. In one embodiment, numerologies can be added or removed from the numerology database 128. The UE configuration module 130 is tasked with selecting a proper numerologies for the mobile device 102. The UE configuration module 130 is also tasked with selecting proper control channels for the mobile device 102 and informing the mobile device about the selected control channels and their respective numerologies. The functionality of the UE configuration module 130 is described in detail below with references to various methodologies of the subject disclosure.

Figure 3:
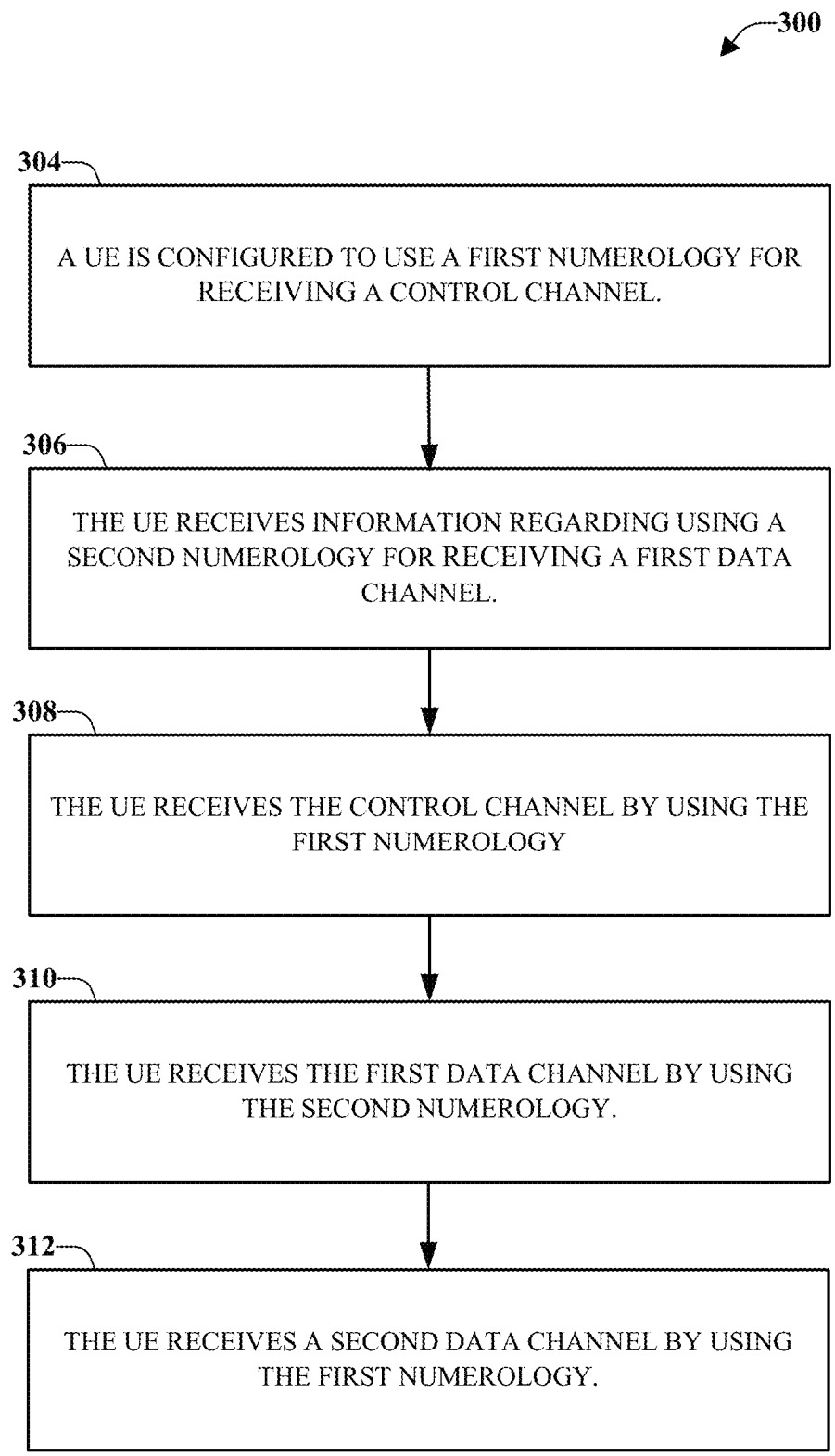
FIG. 3 illustrates an example, non-limiting methodology for transmitting control channel information and data channel information, in accordance with one or more embodiments described herein.

FIG. 3 illustrates an example, non-limiting methodology by which a UE receives control channel, in accordance with one or more embodiments described herein. As illustrated in flow diagram 300, at Step 304, a UE is configured to use a first numerology for receiving a control channel. At Step 306, the UE receives information regarding using a second numerology for receiving a first data channel. At Step 308, the UE receives the control channel by using the first numerology. At Step 310, the UE receives the first data channel by using the second numerology. In one example, the first numerology is a default numerology. In one example, the first numerology is a predefined numerology. In one example, the first numerology is indicated by a synchronization signal. In one example, the first numerology is configured by a broadcast channel. According to an aspect of the subject disclosure, at Step 312, the UE receives a second data channel by using the first numerology. In one example, the second data channel is a broadcast channel. In one example, the second data channel is a paging channel. In one example, the second data channel is a random access response channel.

In one example, the first data channel is for unicast data. In one example, the first data channel is a DL data channel. In one example, the control channel schedules the first data channel. In one example, the second numerology is configured by a radio resource control (RRC) message. In one example, the second numerology is configured after the UE enters a connected mode. In one example, the second numerology is configured by a UE-specific message. In one example, the second numerology is indicated by the control channel. In one example, the second numerology can be different for different time intervals. In one example, the first numerology is cell-specific. In one example, the control channel and the first data channel are in a same cell.

Figure 17:
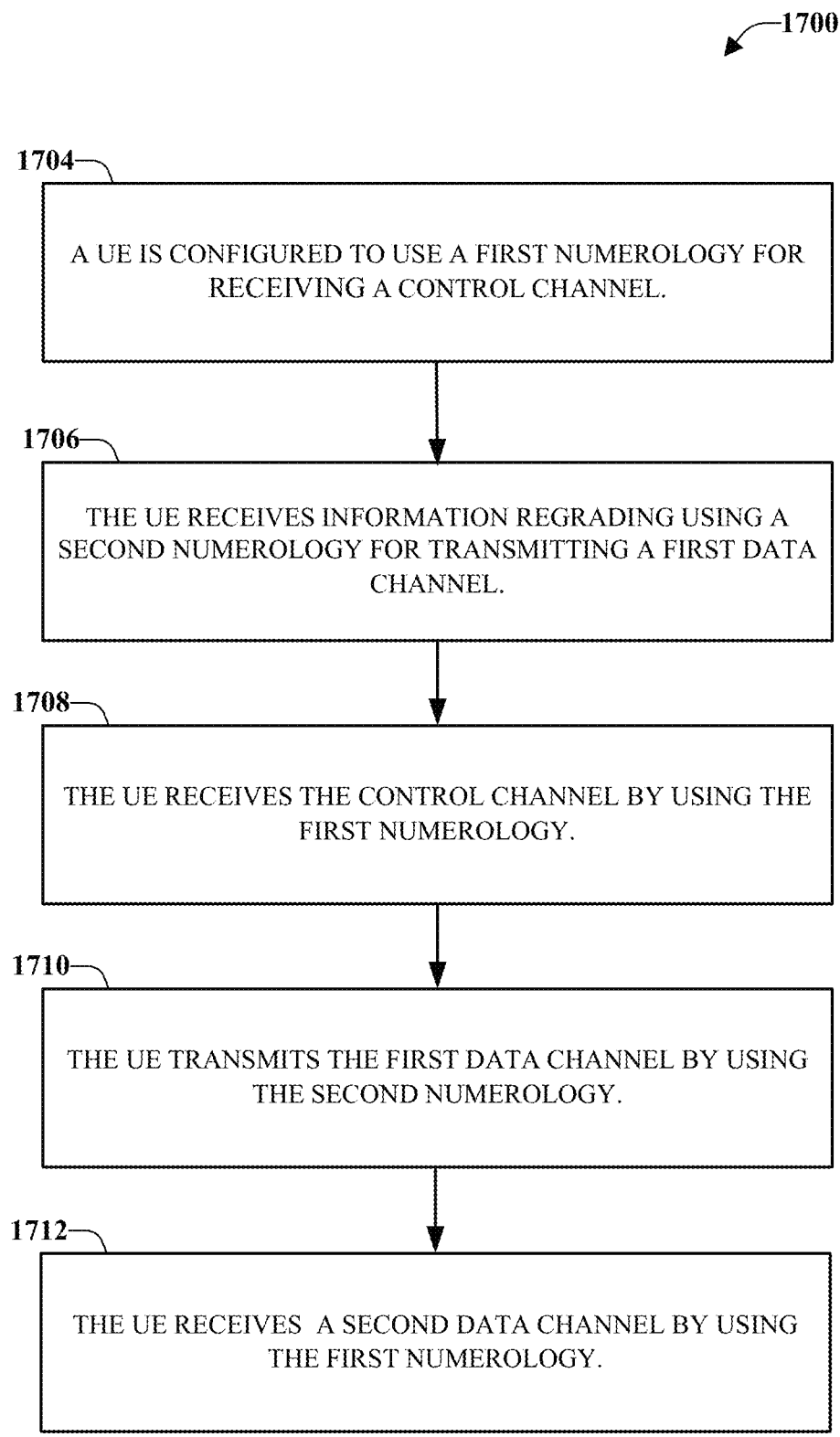
FIG. 17 illustrates an example, non-limiting methodology by which a UE receives a control channel, in accordance with one or more embodiments described herein.

FIG. 17 illustrates an example, non-limiting methodology by which a UE receives control channel, in accordance with one or more embodiments described herein. As illustrated in flow diagram 1700, at Step 1704, a UE is configured to use a first numerology for receiving a control channel. At Step 1706, the UE receives information regarding using a second numerology for transmitting a first data channel. At Step 1708, the UE receives the control channel by using the first numerology. At Step 1710, the UE transmits the first data channel by using the second numerology. In one example, the first numerology is a default numerology. In one example, the first numerology is a predefined numerology. In one example, the first numerology is indicated by a synchronization signal. In one example, the first numerology is configured by a broadcast channel. According to an aspect of the subject disclosure, at Step 1712, the UE receives a second data channel by using the first numerology. In one example, the second data channel is a broadcast channel. In one example, the second data channel is a paging channel. In one example, the second data channel is a random access response channel.

In one example, the first data channel is for unicast data. In one example, the first data channel is an UL data channel. In one example, the control channel schedules the first data channel. In one example, the second numerology is configured by a radio resource control (RRC) message. In one example, the second numerology is configured after the UE enters a connected mode. In one example, the second numerology is configured by a UE-specific message. In one example, the second numerology is indicated by the control channel. In one example, the second numerology can be different for different time intervals. In one example, the first numerology is cell-specific. In one example, the control channel and the first data channel are in a same cell.

The NRs and the 5G networks based on them will have diverse requirements in terms of data rates, latency, and coverage. The NRs will support higher data rates, lower latency and higher reliability than current systems, and the devices and methodologies of the present inventions will take advantage of those advanced capabilities. About data rates, the enhanced mobile broadband (eMBB) is expected to support a peak data rate of 20 Gbps for downlink and 10 Gbps for uplink, and the user experienced data rates expected to be in the order of three times the rate of IMT (international mobile telecommunications)-Advanced. Simultaneously, the NR systems will support ultra low latency and high reliability. For example, the ultra reliable and low latency communication (URLLC) systems are expected to provide an ultra-low latency of 0.5 milliseconds for each of UL and DL for user plane latency and a high reliability of $1-10^{-5}$ within 1 millisecond). Also, massive machine type communication (mMTC) compliant devices will require high connection density (e.g. 1,000,000 devices/$km^2$ in urban environment), large coverage in harsh environments ([164 dB] maximum coupling loss (MCL)), and extremely long-life battery for low cost devices ([15 years]).

To meet the above demands, the 3GPP (3rd Generation Partnership Project) is considering the option is to allow (frequency division multiplexing) FDM/TDM (time division multiplexing) of different types of subframes and/or sub-bands with different subcarrier numerologies (i.e., different subcarrier-spacing values and correspondingly different OFDM symbol lengths) in a single system bandwidth, where the different subcarrier values are chosen according to the use-case specific requirements. In this case, a UE may be configured with a single or multiple subcarrier numerologies, possibly depending upon UE capability or category as well as the use cases the UE supports. Also, the numerologies used for UL and DL transmission may be different due to different service requirements.

Figure 5:
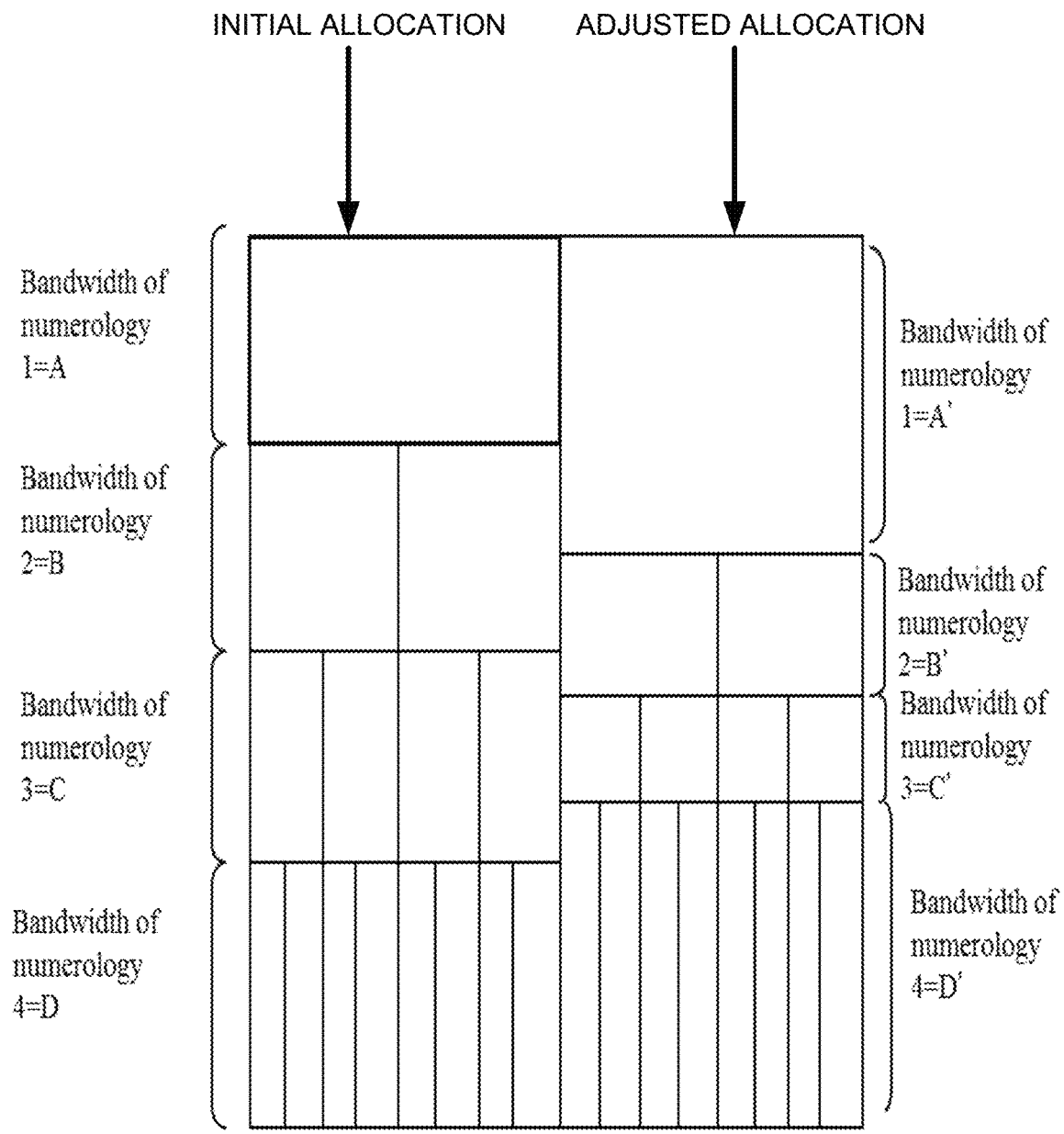
FIG. 5 illustrates an example, non-limiting environment in which bandwidths and frequency locations for various numerologies are adjusted, in accordance with one or more embodiments described herein.

The network may provide a given numerology with certain bandwidth and certain frequency location within the whole system bandwidth, e.g. 100 MHz or 200 MHz. The bandwidth and frequency location may be adjusted according to certain conditions, e.g. the traffic amount required for each numerology, as shown in a example in FIG. 5. Note that FIG. 5 is an example illustration in which the bandwidth for a given numerology is shown to be contiguous. However, in a different embodiment, the bandwidth for a given numerology may be non-contiguous (e.g. in frequency domain). Therefore, when a UE is configured with a given numerology, whether or how UE knows the bandwidth partition (e.g. bandwidth and/or frequency location) for that numerology, and thus correctly derives resource allocation for data transmission or reception, requires some consideration. Stated differently, how the UE detects a control channel needs consideration. The subject disclosure discloses numerous inventions and alternatives for identifying (or selecting) a message or a channel for carrying information regarding bandwidth partition to a UE.

According to one aspect of the subject disclosure, information regarding bandwidth partition is signaled by a physical broadcast channel (PBCH) and/or a system information block (SIB). In one embodiment, preferably, the information regarding bandwidth partition for all numerologies is signaled on a specific numerology. More specifically, the specific numerology is the numerology with which UE detects the corresponding synchronization signal. Alternatively, the information is signaled on a per numerology basis, e.g. a numerology would provide its own bandwidth partition in PBCH and/or SIB on the numerology. Moreover, before getting the bandwidth partition information for a numerology, UE assumes a default bandwidth partition on the numerology. An example of default bandwidth partition comprises a fixed bandwidth and a frequency location derived from synchronization. For example, the frequency location can be derived from system bandwidth (e.g. the total bandwidth for all numerologies), in addition to synchronization.

In one embodiment, synchronization would determine a first frequency location. The first frequency location and an offset value would determine a second frequency location. The default bandwidth is located in the second frequency location (e.g. defined by center frequency or starting frequency). More specifically, the offset value is determined from the total system bandwidth. Alternatively, the offset value is determined from information carried on MIB or SIB. In another embodiment, MIB would indicate a first bandwidth partition of a numerology. The first bandwidth partition allows UE to receive some common signaling, e.g. SIB, on the numerology. The common signal would further indicate a second bandwidth partition of the numerology. Thereafter, the following (or subsequent) UE reception would follow the second bandwidth partition.

According to another aspect of the subject disclosure, information regarding bandwidth partition is signaled by way of radio resource control (RRC). In one embodiment, the MIB or SIB would indicate a first bandwidth partition of a first numerology. The first bandwidth partition allows the UE to receive at least some common signaling, e.g. SIB, on the first numerology. The first bandwidth partition would be utilized in the following (or subsequent) communication. After entering a connected mode, a UE-specific RRC would further indicate a second bandwidth partition of the numerology. The following UE reception would follow the second bandwidth partition. If the second bandwidth partition of the numerology is absent, UE will continue to use the first bandwidth partition. In another embodiment, MIB or SIB would indicate a first bandwidth partition of a first numerology. The first bandwidth partition allows the UE to receive at least some common signaling, e.g. SIB, on the first numerology. The first bandwidth partition would be utilized in the following communication. After entering a connected mode, a UE-specific RRC would further configure a second numerology and a second bandwidth partition of the second numerology. The second UE reception would be on the second numerology and would follow the second bandwidth partition.

According to another aspect of the subject disclosure, a physical control channel is used to carry the information of bandwidth partition. In one embodiment, the information can be used for a single transmission time interval (TTI). Alternatively, the information can be used for multiple TTIs. More specifically, the multiple TTIs are within a fixed duration. Alternatively, the multiple TTIs start at predefined timings. Alternatively, the multiple TTIs start a specific number of TTIs (e.g. X TTIs) after receiving the control channel information. Alternatively, the bandwidth partition information can be used until new information is received. Preferably, the information is transmitted together with scheduling information. More specifically, the scheduling information is for DL data. Alternatively, the information is transmitted on a specific channel. Preferably, the information includes bandwidth partition for all available numerologies. Alternatively, the information includes bandwidth partition for a single numerology. More specifically, the single numerology is the numerology UE is configured with. Alternatively, the single numerology is the numerology that the UE decodes a corresponding control channel with. Alternatively, the single numerology is indicated in the same control channel According to another aspect of the subject disclosure, in one embodiment, the whole system bandwidth is be considered as including potential candidates for a numerology. In one embodiment, the maximum bandwidth that the UE can receive with the numerology is less than the system bandwidth. In one example, the network indicates to the UE which resource blocks would be utilized for the data transmission with the numerology that the UE is configured with. Preferably, the UE can ignore a scheduling request if the total resource allocated for the UE is larger than what UE is able to receive, or if the bandwidth indicated is larger than what the UE is able to receive. Alternatively, the UE can receive data according to a scheduling request even if the total resource allocated for the UE is larger than what UE is able to receive, or if the bandwidth indicated is larger than what UE is able to receive. In this alternative, the UE would only receive the data within the maximum bandwidth that can be received by the UE, and would not receive the data outside the maximum bandwidth. The UE may need a way to determine which part of the data includes the valid resource to be counted within the maximum bandwidth. In one example, UE counts the maximum bandwidth starting from the resource block with lowest frequency within the resource allocation. In another example, UE counts the maximum bandwidth starting from the resource block with highest frequency within the resource allocation.

According an aspect of the subject disclosure, the following embodiments can be considered for implementing any of the above alternatives or any combinations of above alternatives. In one preferred embodiment, a UE is configured with a first numerology for a control channel and is informed to use a second numerology for a data channel. The data channel is a unicast data channel. The second numerology is different form the first numerology. The first numerology is a default/predefined numerology. The first numerology is a cell-specific numerology. The first numerology is the largest numerology. The first numerology is indicated on a broadcast channel. In an example, the broadcast channel does not have an associated control channel. Furthermore, the broadcast channel can be transmitted with a fixed or predefined numerology. In another example, the broadcast channel does have an associated control channel, and the associated control channel is transmitted with a default/predefined numerology.

Figure 4:
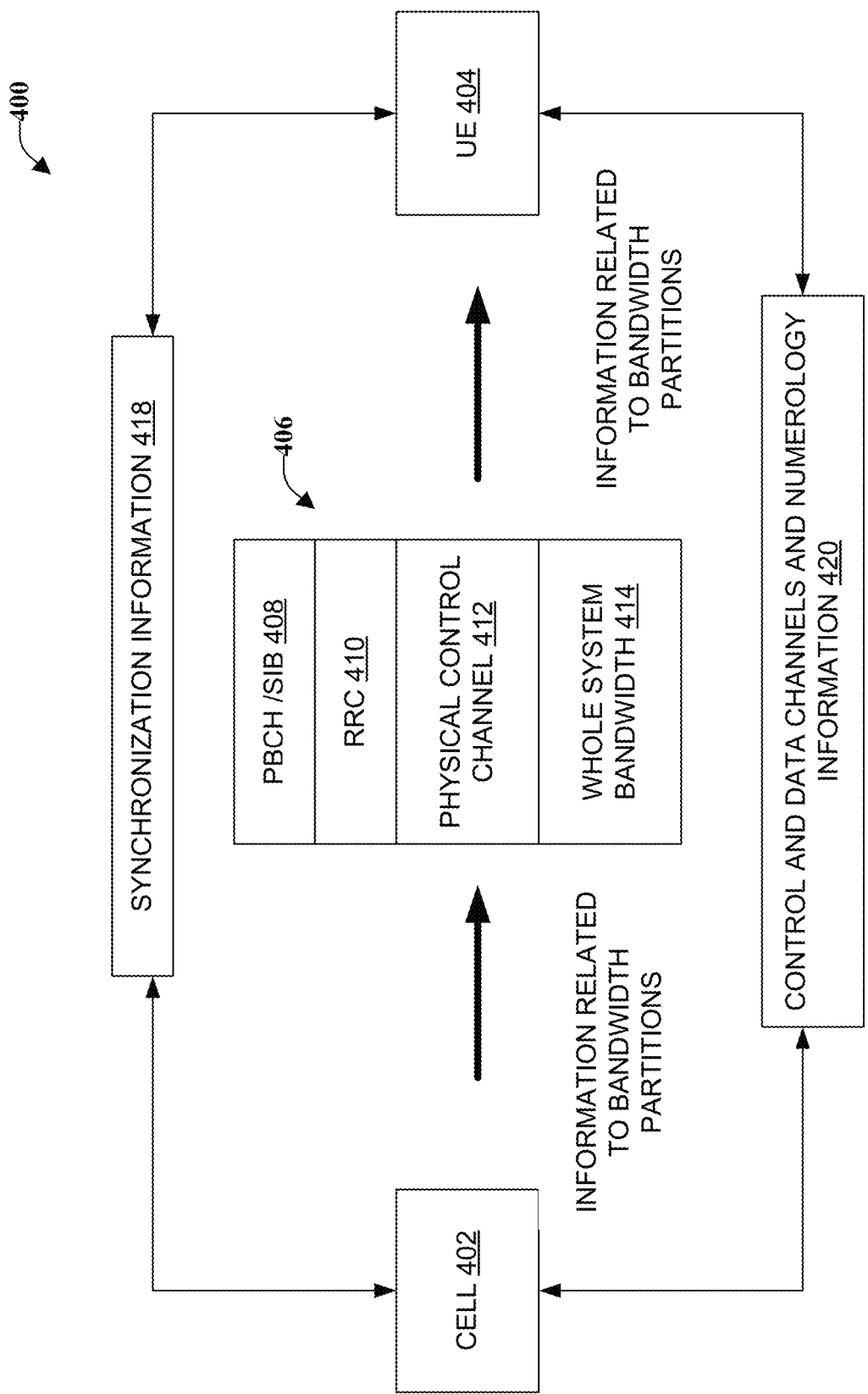
FIG. 4 illustrates an example, non-limiting methodology for transmitting information related to bandwidth partitions, in accordance with one or more embodiments described herein.

FIG. 4 summarizes the four alternative methodologies of the subject disclosure discussed above for transmitting information related to bandwidth partition from the cell 402 to the UE 404. As illustrated in the environment 400, four methodologies 406 are shown for carrying the bandwidth partition information from the cell 402 to the UE 404. The four methodologies 406 include signaling by way of PBCH and/or SIB 408, signaling by way of RRC 410, using a physical control channel 412 to carry information related to bandwidth partition and providing information about the bandwidth for the whole system bandwidth 414. As illustrated in FIG. 4, the cell 402 and the UE 404 also exchange synchronization information 418 and information about data channels and control channels 420. The synchronization information 418 and the information about data/control channels 420 may include numerologies related information or indications.

In one embodiment, preferably, the first numerology is indicated by a synchronization channel. More specifically, a broadcast channel is transmitted with the first numerology. Preferably, the second numerology is UE specifically configured. Preferably, the second numerology is configured after UE entering connected mode. Preferably, the second numerology is indicated by a control channel Preferably, the control channel is associated with a corresponding unicast data channel which is transmitted with the second numerology. Preferably, the second numerology is applied to the unicast data channel associated with the control channel. More specifically, "associated" means the control channel providing scheduling information for the data channel Preferably, the second numerology is selected according to a service requirement for the unicast data channel Preferably, the control channel can be used to schedule unicast data. Preferably, the control channel can be used to schedule common data, e.g. broadcast information, paging information or random access response. Preferably, the control channel and the data channel are multiplexed in the time domain.

In one example, a first numerology is configured for control channel reception. Meaning that the UE tries to decode the control channel with the first numerology. If a control channel is detected and there is a corresponding data channel, the control channel may further indicate a second numerology for data channel reception (DL) or transmission (UL). The second numerology may be the same as the first numerology or different from the first numerology. A default numerology can be defined for a certain type of data channel so that extra indication of numerologies may not be needed for that type of data channel. By doing so, numerologies for data communication can be adapted dynamically to fulfill different requirements while control channel reception can be kept the same to avoid increase in complexity or latency of decoding. Also, by doing so, a UE that does not have the simultaneous processing capability of multiple numerologies can adapt a data numerology quickly and efficiently. FIG. 6 illustrates an example methodology in which control channel that is controlled with a specific numerology schedules a data channel to be controlled with a different numerology.

In one embodiment, different frequency regions for data channel scheduling are associated with different control channel candidates. If a control channel candidate is successfully decoded, the corresponding data channel would be scheduled within the associated frequency region. More specifically, the control channel would indicate which resource within the associated frequency region would be used for the data channel. In some examples, preferably, a frequency region is a portion of a system bandwidth of a cell. Preferably, UE is configured with the locations/ranges of several frequency regions. Preferably, the frequency region is implicitly derived from the system bandwidth of the cell. In the following, how the association is done is described. Preferably, a control channel candidate within a first frequency region would be associated with the same first frequency region. Alternatively, an index of a control channel candidate would be associated with an index of a frequency region. More specifically, the index of the control channel is an index of a control channel element. More specifically, the index of the frequency region follows a frequency order of the frequency region. Preferably, the index of the associated frequency region is derived from the index of the corresponding control channel candidate. More specifically, an equation is used to derive the index. Alternatively, a look-up table is used to derive the index. Preferably, a frequency region closest to a control channel candidate in frequency domain would be associated with the control channel candidate. Preferably, a control channel candidate would determine a frequency location of a frequency region, e.g. the center of the frequency location, and the frequency location would have a configurable or predefined bandwidth.

In one embodiment, a UE is configured with a first numerology for DL data channel and a second numerology for UL data channel and a third numerology for control channel Preferably, the third numerology is derived from the first numerology and the second numerology. More specifically, the third numerology is the smaller one between the first numerology and the second numerology. Alternatively, the third numerology is the larger one between the first numerology and the second numerology. Preferably, the third numerology is different from the first numerology and the second numerology. Preferably, the third numerology is a default or predefined numerology.

The various aspects described above can be applied to or implemented in exemplary wireless communication systems and devices described below. In addition, the various aspects are described mainly in the context of the 3GPP architecture reference model. However, it is understood that with the disclosed information, one skilled in the art could easily adapt for use and implement aspects of the invention in a 3GPP2 network architecture as well as in other network architectures. The exemplary wireless communication systems and devices described in this disclosure employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WiMax, or some other modulation techniques.

Figure 7:
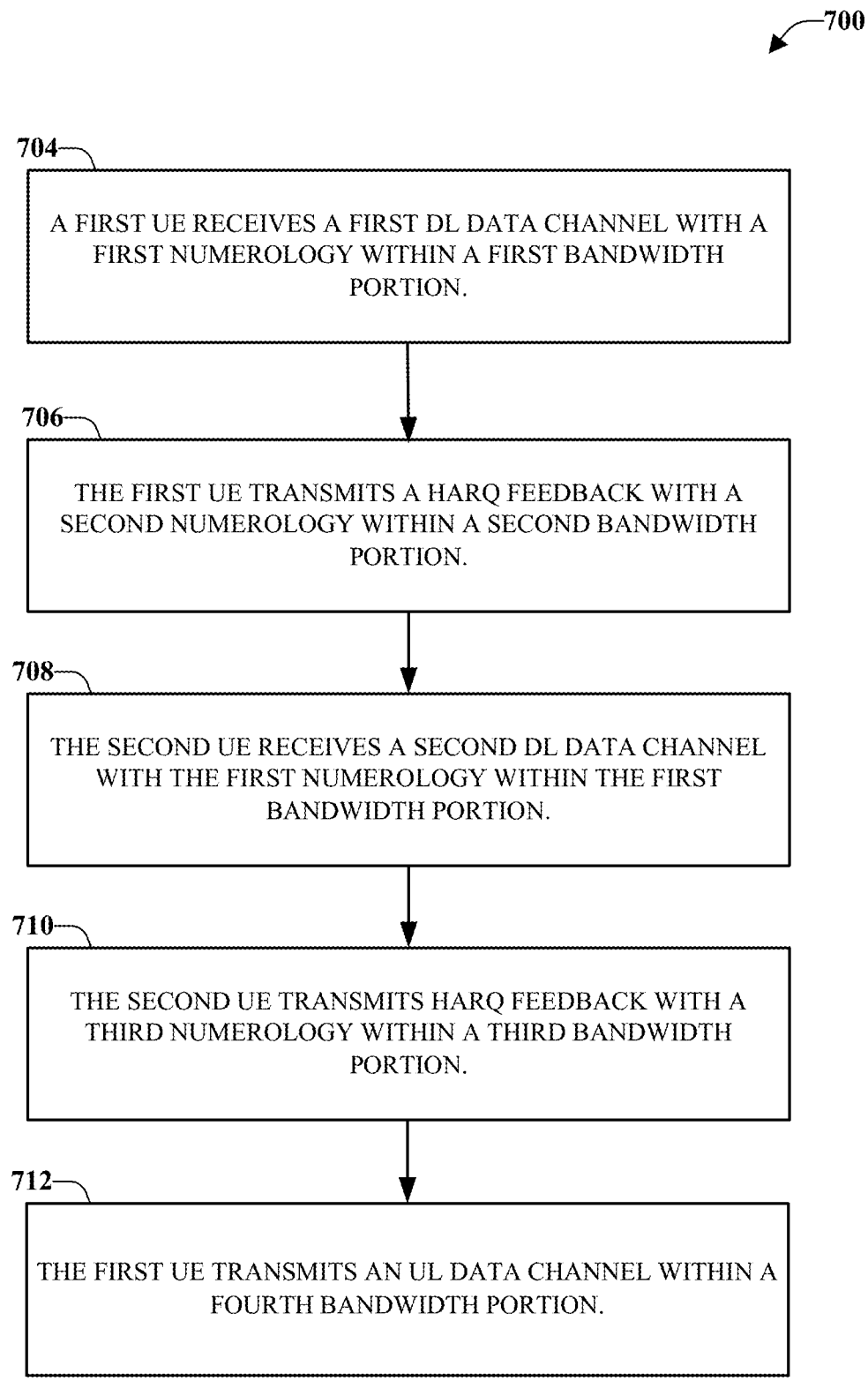
FIG. 7 illustrates an example, non-limiting methodology for communicating data channel information and HARQ feedback, in accordance with one or more embodiments described herein.

FIG. 7 illustrates a methodology for transmitting hybrid automatic repeat request (HARQ) feedback. As illustrated in flow diagram 700, at Step 704, a first UE receives a first downlink (DL) data channel with a first numerology within a first bandwidth portion. At Step 706, the first UE transmits a HARQ feedback with a second numerology corresponding to data in the first downlink data channel within a second bandwidth portion. In one example, the second bandwidth portion is located in the first bandwidth portion. In one example, the first numerology and the second numerology are different. In one example, the first UE transmits the HARQ feedback in a cell in which the first UE receives the first downlink data channel.

In one example, the first numerology and the second numerology are the same. Another aspect of the subject disclosure, at Step 708, a second UE receives a second DL data channel with the first numerology within the first bandwidth portion. At Step 710, the second UE transmits a HARQ feedback with a third numerology corresponding to data in the second downlink data channel within a third bandwidth portion. In one example, the second numerology and the third numerology are different. In one example, the second bandwidth portion and the third bandwidth portion do not overlap. In one example, the third bandwidth portion is located in the first bandwidth portion. In one example, a location of the first bandwidth portion is configured (or programmed or determined). In one example, a location of the first bandwidth portion is derived from a first DL control channel associated with the first DL data channel. In one example, the first downlink control channel indicates a location of the first bandwidth portion. In one example, a resource used to carry the first downlink control channel determines the location of the first bandwidth portion.

In one example, a location of the second bandwidth portion is fixed. In one example, a location of the second bandwidth portion is configured. In one example, a location of the second bandwidth portion is derived from the first downlink control channel. In one example, a location of the second bandwidth portion is adjusted if the third bandwidth portion is adjusted. In one example, a relative location of the second bandwidth portion within the first bandwidth portion is fixed. In one example, a relative location of the second bandwidth portion within the first bandwidth portion is configured. In one example, a relative location of the second bandwidth portion within the first bandwidth portion is derived from the first downlink control channel information. In various examples, a relative location can be the resource block(s) with the lowest frequency, resource block(s) with the highest frequency, or resource block(s) starting from a specific resource block, e.g. the fifth resource block counting from the resource block with lowest frequency.

In one example, a resource allocation field allocates the first DL data channel within the first bandwidth portion. In one example, a resource allocation field allocates the first DL data channel cannot schedule data outside the first bandwidth portion. In one example, the first bandwidth portion is the maximum resource that can be allocated for the first downlink data channel. In one example, a resource used to carry the HARQ feedback is fixed. In one example, a resource used to carry the HARQ feedback is configured. In one example, a resource used to carry the HARQ feedback is derived from the first downlink control channel information. In one example, a relative location of resource used to carry the HARQ feedback within the second bandwidth portion is fixed. In one example, a relative location of resource used to carry the HARQ feedback within the second bandwidth portion is configured. In one example, a relative location of resource used to carry the HARQ feedback within the second bandwidth portion is derived from the first downlink control channel.

At Step 712, the first UE transmits an UL data channel within a fourth bandwidth portion. In one example, the information regarding the first bandwidth portion and information regarding the fourth bandwidth portion are separately signalled. In one example, the fourth bandwidth portion does not overlap with the second bandwidth portion. In one example, the fourth bandwidth portion does not overlap with the first bandwidth portion. In one example, the fourth bandwidth portion is the maximum resource that can be used to schedule uplink data of the first UE. In one example, the fourth bandwidth portion is configured. In one example, the fourth bandwidth portion is derived from a second downlink control channel associated with the uplink data channel. In one example, the UE transmits uplink control channel other than HARQ feedback on a fifth bandwidth portion.

According to an aspect of the subject disclosure, a UE receives a first DL data channel with a first numerology. The UE transmit a HARQ feedback with a second numerology. The second numerology is within a subset of available uplink numerologies. In one example, the subset of available uplink numerologies includes numerologies with subcarrier spacing larger than or equal to the subcarrier spacing of the first numerology. In one example, the subset of available uplink numerologies includes numerologies with subcarrier spacing smaller than or equal to the subcarrier spacing of the first numerology. In one example, the subset of available uplink numerologies is configured. In one example, the number of numerologies within the subset cannot exceed X, e.g. X=3. In one example, the subset of available uplink numerologies is X numerologies with subcarrier spacing closet to the subcarrier spacing of the first numerology, e.g. X=3.

According to an aspect of the subject disclosure, a base station transmits a first DL data channel with a first numerology within a first bandwidth portion to a first UE. The base station receives a HARQ feedback with a second numerology corresponding to data in the first downlink data channel within a second bandwidth portion. The base station transmits a second DL data channel with the first numerology within the first bandwidth portion to a second UE. The base station receives a HARQ feedback with a third numerology corresponding to data in the second downlink data channel within a third bandwidth portion. In one example, the first numerology and the second numerology are different. In one example, the first numerology and the third numerology are the different. In one example, the second bandwidth portion and the third bandwidth portion do not overlap. In one example, the second bandwidth portion is located in the first bandwidth portion. In one example, the third bandwidth portion is located in the first bandwidth portion. In one example, the second bandwidth portion and the first bandwidth portion are multiplexed in time domain. In one example, the third bandwidth portion and the first bandwidth portion are multiplexed in time domain.

According to an aspect of the subject disclosure, another methodology of receiving HARQ feedback is disclosed. In the methodology, a base station transmits a first DL data channel with a first numerology to a UE. The base station receives a HARQ feedback with a second numerology. The second numerology is within a subset of available uplink numerologies. In one example, the subset of available uplink numerologies includes numerologies with subcarrier spacing larger than or equal to the subcarrier spacing of the first numerology. In one example, the subset of available uplink numerology includes numerologies with subcarrier spacing smaller than or equal to the subcarrier spacing of the first numerology. In one example, the subset of available uplink numerologies is configured. In one example, the number of numerologies within the subset cannot exceed X, e.g. X=3. In one example, the subset of available uplink numerologies includes X numerologies with subcarrier spacing closet to the subcarrier spacing of the first numerology, e.g. X=3. In one example, the methodology is applied to a time division duplex (TDD) system.

According to an aspect of the subject disclosure, for a TDD structure, network may need to further understand how to partition the DL bandwidth as well as the UL bandwidth, as the UL bandwidth and DL bandwidth may have some relationship, e.g. receiving DL data in a DL bandwidth and transmitting a corresponding UL HARQ feedback in the UL bandwidth. In some embodiments of the subject disclosure, numerology refers to subcarrier spacing and/or cyclic prefix length. According to an aspect of the subject disclosure, a first numerology is configured for DL control/data a second numerology is configured for UL control/data. According to another aspect of the subject disclosure, a first numerology configured for DL data and uplink control and a second numerology configured for DL control and uplink data.

According to another aspect of the subject disclosure, a first numerology is configured for DL control, DL data and uplink control and a second numerology configured for uplink data. According to another aspect of the subject disclosure, a first numerology is configured for DL data and uplink control, a second numerology configured for uplink data and a third numerology configured for DL control.

In one embodiment, preferably, the base station would partition bandwidth for downlink transmission for multiple numerologies with a first partition, e.g. assigning frequency resource for multiple numerologies, and partition bandwidth for uplink transmission with a second partition. Preferably, the first partition and the second partition are different. Preferably, within a bandwidth portion of a given numerology for DL transmission, more than one numerology for UL transmission would locate in the bandwidth portion. Preferably, the UL transmission is HARQ feedback transmission. Preferably, the UL transmission cannot be used for UL data transmission. Preferably, for a UE there is a first UL bandwidth portion for an UL data transmission and there is a second UL bandwidth portion for a HARQ feedback transmission. More specifically, the second UL bandwidth portion is located in a third bandwidth portion which is used to receive a corresponding downlink data of the HARQ feedback. Preferably, there is a fourth bandwidth portion for transmitting UL control information other than HARQ feedback.

Preferably, the UL control information other than HARQ feedback includes channel state information. Preferably, UL control information other than HARQ feedback is a scheduling request. Preferably, the UE realizes the location of the third bandwidth portion according to a downlink control channel associated with the downlink data. Preferably, the UE realizes the location of the third bandwidth portion according to a configuration. Preferably, the second bandwidth portion is located in a configured location of the third bandwidth portion. Preferably, the second bandwidth portion is located in a configured location of the third bandwidth portion which is derived from an associated downlink control channel. Preferably, the location is derived from a resource occupied by a downlink control channel. Preferably, the third bandwidth portion and second bandwidth portion are multiplexed in time domain. Preferably, a resource for transmitting the HARQ feedback is selected from resources within the second bandwidth portion. Preferably, a resource for transmitting the HARQ feedback is selected according to a predefined rule.

Figure 8:
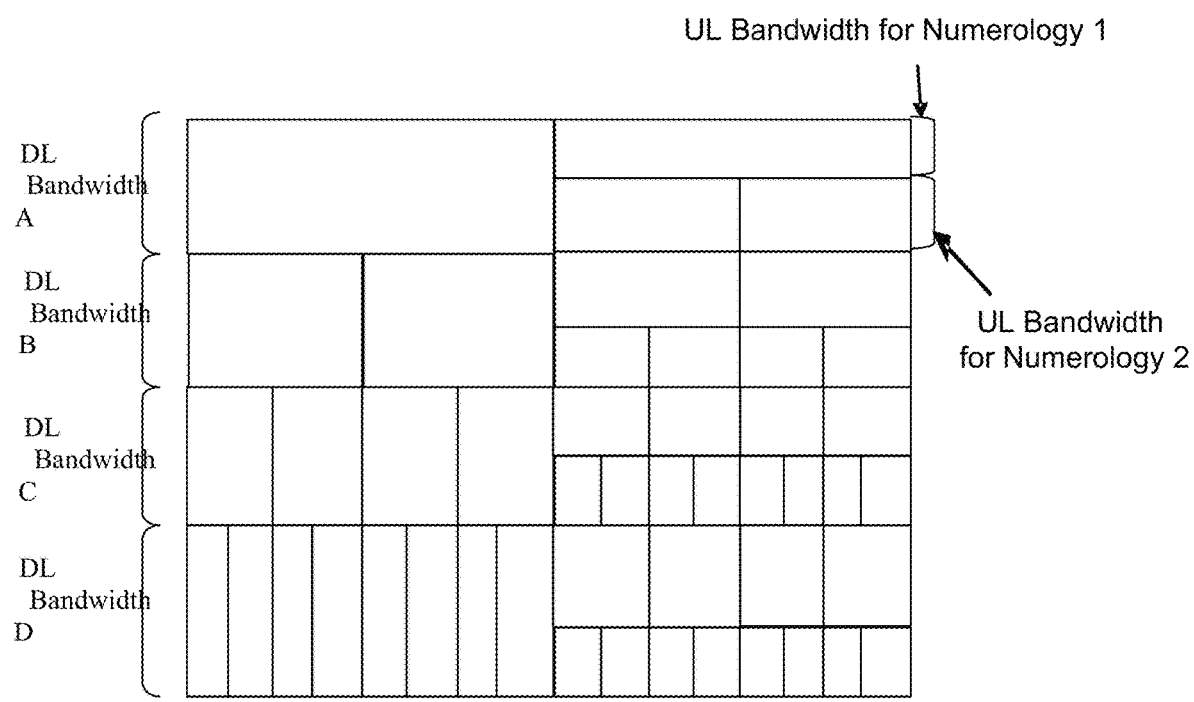
FIG. 8 illustrates an example, non-limiting structure of downlink (DL) and uplink (UL) bandwidth partition, in accordance with one or more embodiments described herein.

Preferably, a resource for transmitting the HARQ feedback is selected according to a configuration. Preferably, a resource for transmitting the HARQ feedback is indicated by a downlink control channel. Preferably, the first bandwidth portion and the second bandwidth portion do not overlap in the frequency domain. Preferably, a first UE transmits UL data on the first bandwidth portion and transmits HARQ feedback on the second bandwidth portion, with the same numerology. Preferably, a first UE transmits UL data on the first bandwidth portion and transmits HARQ feedback on the second bandwidth portion, with different numerologies. Preferably, the first bandwidth portion is indicated by another signaling. Preferably, the resource allocated for UL data is a subset of the first bandwidth portion. Preferably, the first bandwidth portion and the third bandwidth portion are independently signaled. Preferably, the first bandwidth portion and the third bandwidth portion are different. Preferably, the base station operates in TDD mode. FIG. 8 illustrates an example of downlink and uplink bandwidth partition.

The DL data channel and the corresponding HARQ feedback channel may use different numerologies. Preferably, there is a restriction between the numerology used for DL data and the numerology used for corresponding HARQ feedback. Preferably, for a downlink data channel with a given numerology, a subset of UL numerologies can be used for HARQ feedback transmission. Meaning that not all UL numerologies used by a base station can be used for HARQ feedback transmission for a DL data channel with a given numerology. Preferably, the subset of UL numerologies includes numerologies with subcarrier spacing larger than or equal to a subcarrier spacing of a numerology used for DL data. Preferably, the subset of UL numerology includes numerologies with subcarrier spacing twice of or equal to a subcarrier spacing of a numerology used for DL data. Preferably, the subset of UL numerology is numerologies with subcarrier spacing half of or equal to a subcarrier spacing of a numerology used for DL data. Preferably, the subset of UL numerology is numerologies with subcarrier spacing smaller than or equal to a subcarrier spacing of a numerology used for DL data.

Figure 9:
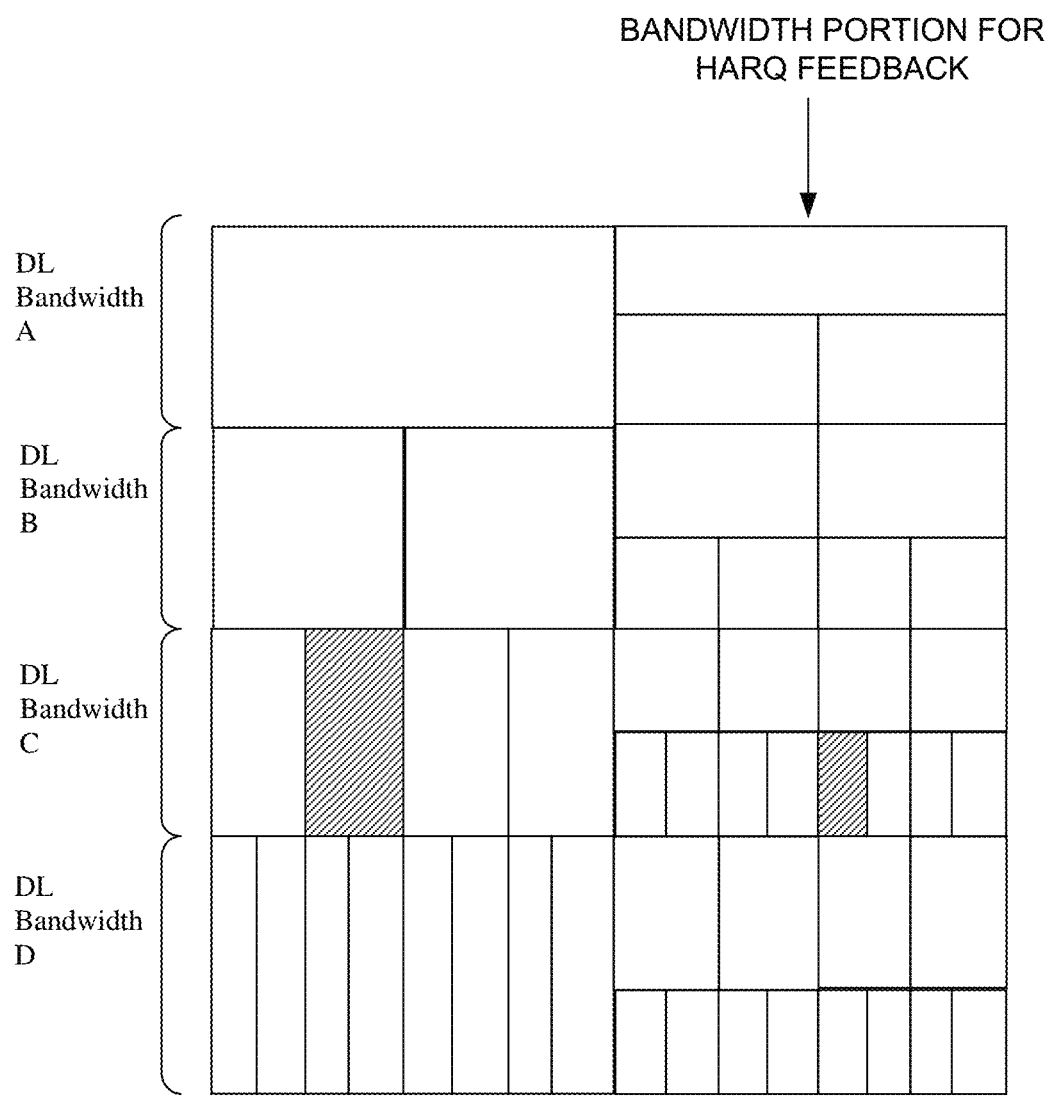
FIG. 9 illustrates an example, non-limiting relationship between bandwidth portion for DL data and bandwidth portion for HARQ feedback, in accordance with one or more embodiments described herein.

FIG. 9 illustrates example relationships between bandwidth portions for DL data and corresponding bandwidth portions for HARQ feedbacks. As illustrated in FIG. 9, in some examples, edge(s) of some bandwidth portions for HARQ feedbacks are aligned with edge(s) of bandwidth portions for DL data. In another example, edge(s) of some bandwidth portions for HARQ feedbacks are not aligned with edge(s) of bandwidth portions for DL data. According to an aspect of the subject disclosure, there can be multiple bandwidth portions for HARQ feedbacks which are transmitted with the same numerology for a given instance, and which correspond to DL data channels with different numerologies. With proper allocation of bandwidth portion for downlink data and bandwidth portion for HARQ feedback, the frequency separation between DL data and HARQ feedback can be minimized, so as to avoid any RF retune between DL data transmission and HARQ feedback transmission. It is to be appreciated that the bandwidth portion mentioned in this disclosure relates to a set of resources in a frequency domain which may be described by their respective location(s) and bandwidth(s).

When a single numerology is adopted for downlink control channel, how to arrange the OFDM symbols for the control channel becomes a cause of concern. For a given time duration, e.g. 1 millisecond (ms), the number of OFDM symbols used for different numerologies are different. That means that there would be a limitation on how many OFDM symbols are available to be used for control based on the OFDM symbol length of the data channel, when integral number of OFDM symbols (in view of the numerology of data channel) are used for control. For example, if a subcarrier spacing of 4*X kHz is used for the control channel and a subcarrier spacing of X kHz is used for the data channel, there will be at least 4 OFDM symbols with 4*X kHz spacing used for control (which corresponds to 1 OFDM symbol with X kHz spacing). That means that there is four times the overhead when using X kHz subcarrier spacing for both control and data compared to one OFDM symbol used for control.

In some examples, the required control signaling overhead may be similar for two numerologies, e.g. when same or similar number of UEs are scheduled to use each of the two numerologies. In conventional systems, the granularity (or preset increment) of the number of OFDM symbols for a frequency resource for a data channel with X kHz subcarrier spacing is 4, 8, 12 OFDM symbols. That is restrictive and wasteful when compared with the variant control overhead that is actually/really required. Inventions of the subject disclosure provide solutions for using only the needed or desired number of OFDM symbols are used for a control channel, e.g. using only 2 OFDM symbols out of the 4 available ones.

Figure 10:
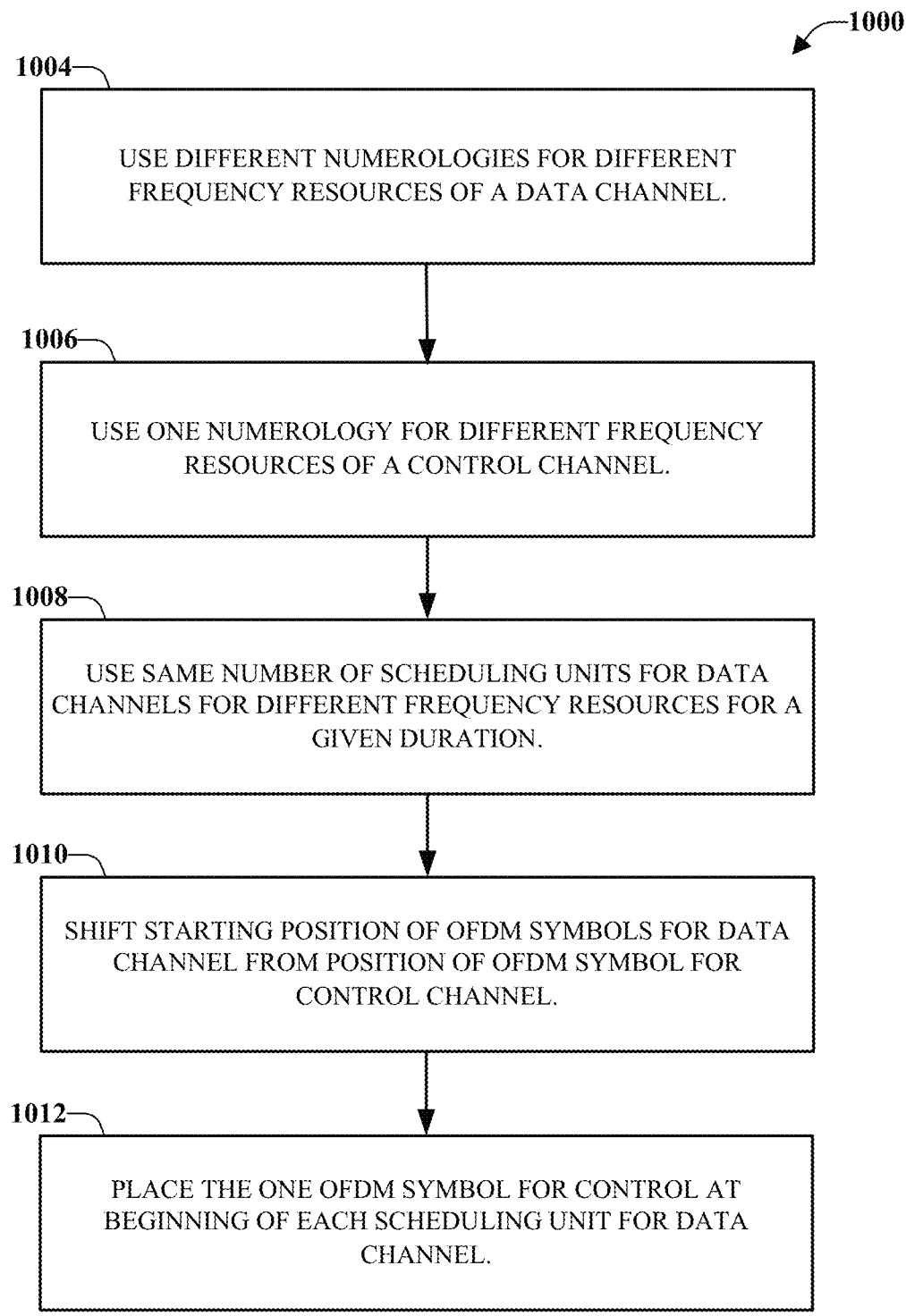
FIG. 10 illustrates an example, non-limiting methodology for managing frequency resources if a data channel and a control channel, in accordance with one or more embodiments described herein.

FIG. 10 illustrates an example non-limiting methodology for using OFDM symbols in data and control channels, according to an aspect of the subject disclosure. As illustrates in the flow diagram 1000, at Step 1004, different numerologies used for the different frequency resources of a data channel. At Step 1006, only one numerology is used for the different frequency resources of a control channel. In one example, the numerology used for the control channel is the numerology with the largest subcarrier spacing. At Step 1008, within a specific time duration, the number of scheduling units for data channels, e.g. TTI, slot, or mini slot, are the same for all the frequency resources. At Step 1010, the starting position of the OFDM symbols for numerology of the data channel, within a given time period, is shifted by one OFDM symbol in comparison with the OFDM symbol for the numerology of the control channel At Step 1012, the one OFDM symbol for the numerology for the control channel is placed at the beginning of each scheduling unit of the data channel. Furthermore, in some examples, each scheduling unit of the data channel's different frequency resources would comprise different number of OFDM symbols corresponding with the different subcarrier spacings for the data channel.

Figure 11:
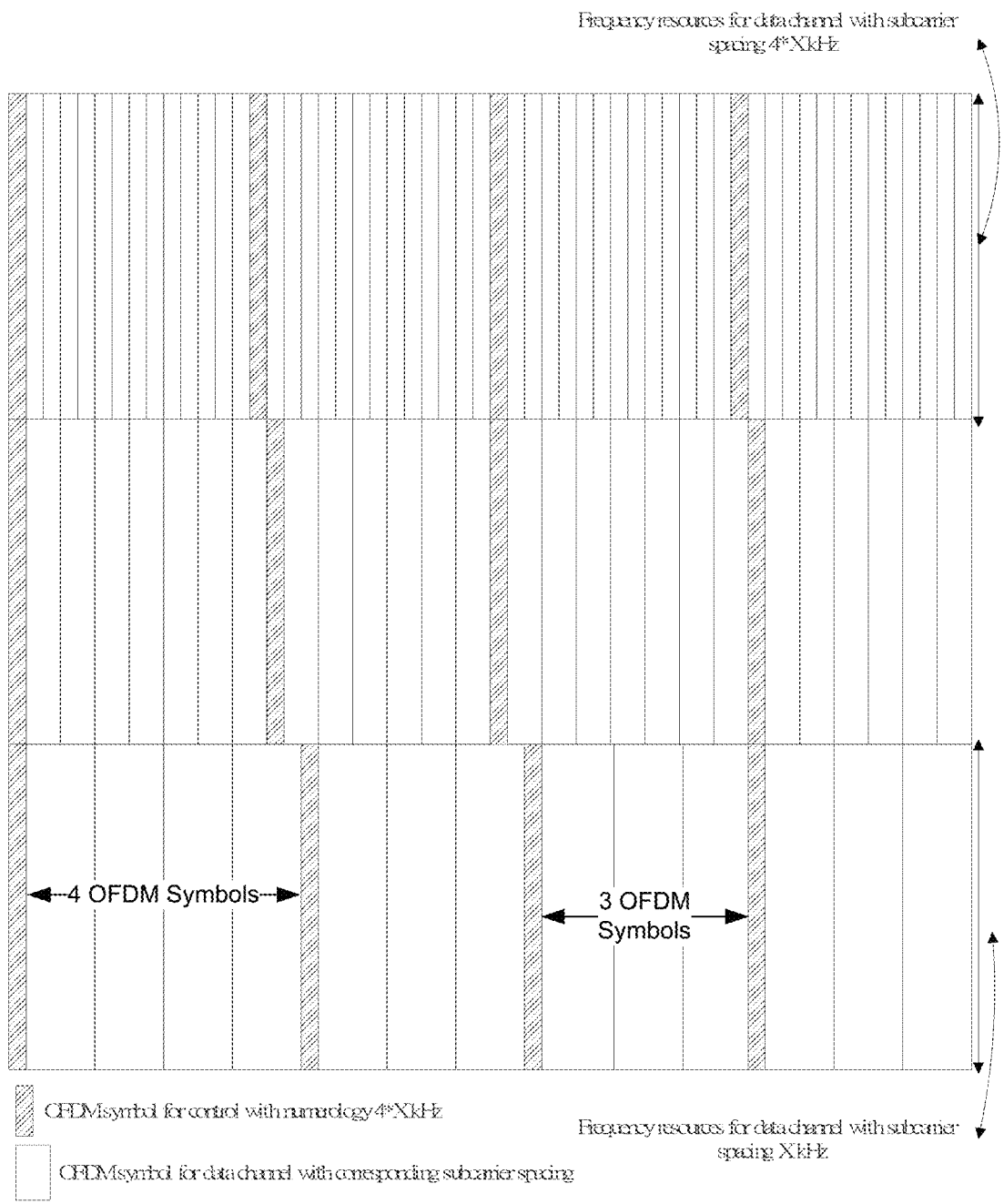
FIG. 11 illustrates an example, non-limiting structure for populating scheduling units of a data channel with OFDM symbols, in accordance with one or more embodiments described herein.

FIG. 11 illustrates an example structure in which the OFDM symbols are arranged. As can be observed from FIG. 11, the number of OFDM symbols within a scheduling unit for a data channel can be different for different frequency resources. Taking a data channel with subcarrier spacing X kHz as an example, the number of OFDM symbols within a scheduling unit can be 3 or 4. Note that in this example, the number of OFDM symbols within different scheduling units within a frequency resource may be different. It is also possible that the number of OFDM symbols within different scheduling units within a frequency resource are equal (every scheduling unit can comprise 3 OFDM symbols).

Figure 12:
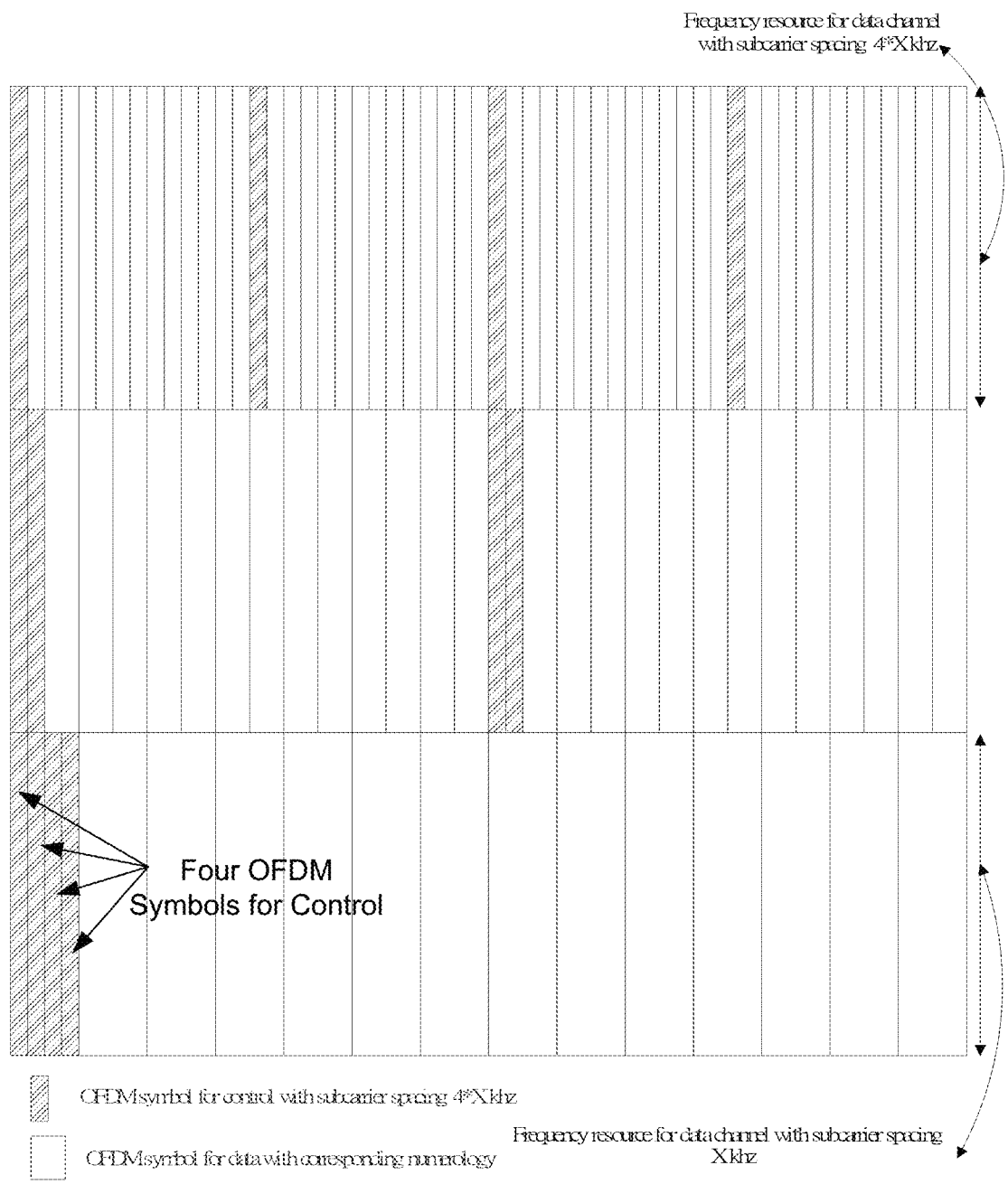
FIG. 12 illustrates another example, non-limiting structure for populating scheduling units of a data channel with OFDM symbols, in accordance with one or more embodiments described herein.

FIG. 12 illustrates an example alternative structure in which the OFDM symbols are arranged. As illustrated, within a specific duration, the number of scheduling units for a data channel, e.g. TTI, slot, or mini slot, would be different for different frequency resources. For example, the difference between the number of scheduling units used by two frequency resources can be in the order of power of two multiple. Furthermore, the starting position of OFDM symbols for numerology of data, within a given period, would be shifted by one from the OFDM symbol for control. Furthermore, there can be different numbers of OFDM symbols for the numerology for control at the beginning of each scheduling unit of a data channel. Furthermore, the scheduling units of the data channel for different frequency resources would comprise the same number of OFDM symbols corresponding to subcarrier spacings for the data channel. More specifically, the control channel on different OFDM symbols would be used for different beams. For example, there are 4 OFDM symbols for control for frequency resource for data channel with subcarrier spacing X kHz. More specifically, different base station/TRP beams would be applied for the 4 OFDM symbols. In one embodiment, the four symbols comprise the same control information. In another embodiment, the four symbols comprise different control information.

Figure 18:
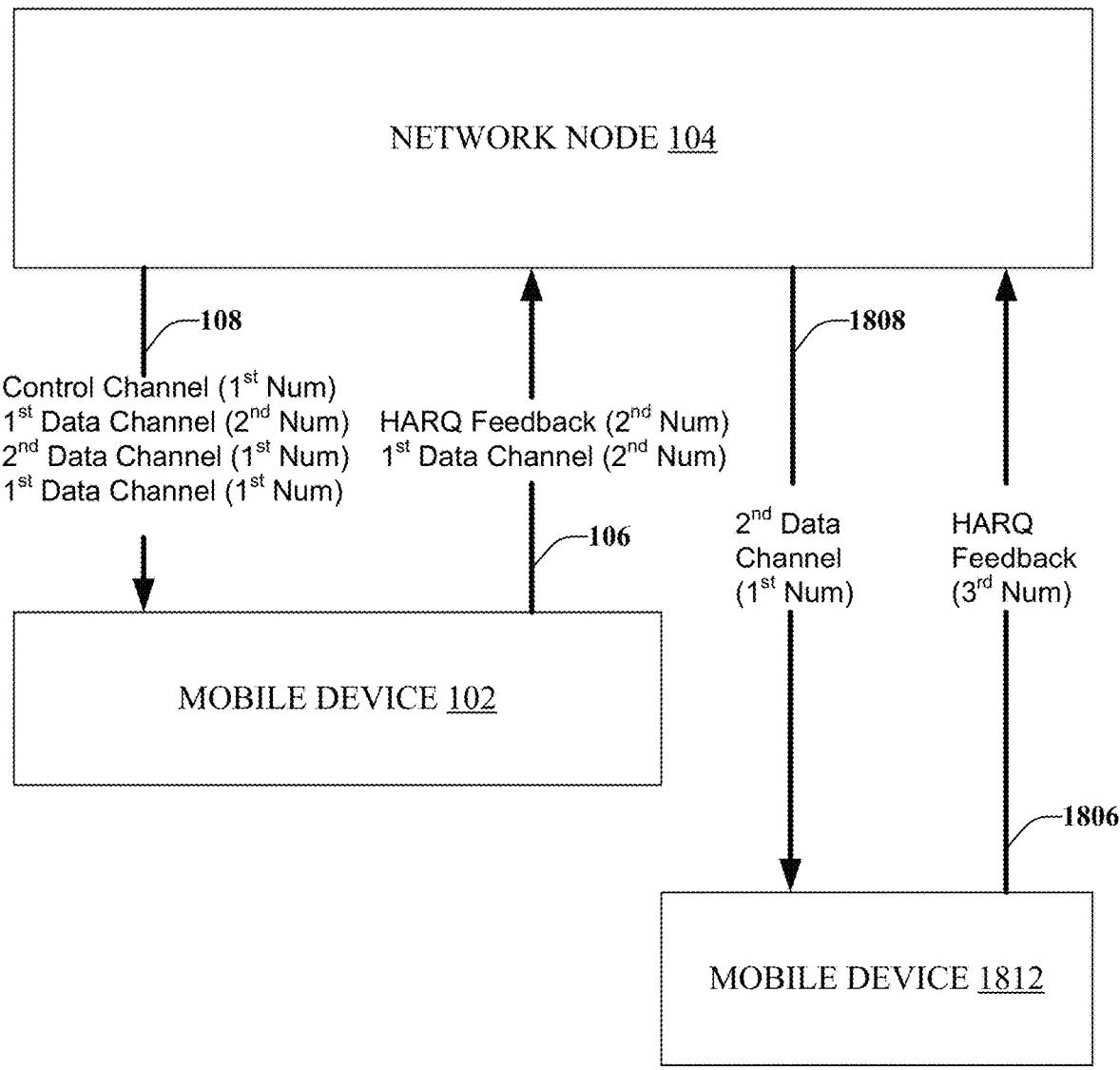
FIG. 18 illustrates an example, non-limiting wireless communications system for transmitting control channel information including two UEs, in accordance with one or more embodiments described herein.

FIG. 18 illustrates an example wireless communication system in which two UEs are interacting with the network node, in accordance with one or more embodiments described herein. Components and functions of the network node 104 and the mobile device 102 have been described herein with reference to FIG. 1. Mobile device 1812 has similar components and functions as the mobile device 102. The mobile device 102 is communicatively coupled with the network node 104 by way of the uplink (UL) 106 and the downlink (DL) 108. As illustrated in FIGS. 3, 7 and 17, at least the following communications occur between the network node 104 and the mobile devices 102, 1812. By way of the downlink 108, the network node 104 transmits and the mobile device 102 receives the control channel by using the first numerology, the first data channel by using the second numerology, and the second data channel (e.g. a DL data channel) by using the first numerology. By way of the uplink 106, the UE 102 transmits and the mobile device 102 receives the HARQ feedback using the second numerology (in response to receiving the first data channel), and the first data channel using the second numerology. By way of the downlink 1808, the network node 104 transmits and the mobile device 1812 receives the second data channel using the first numerology. In response, by way of the uplink 1806, the mobile device 1812 transmits and the network node 104 receives the HARQ feedback by using the third numerology.

Figure 13:
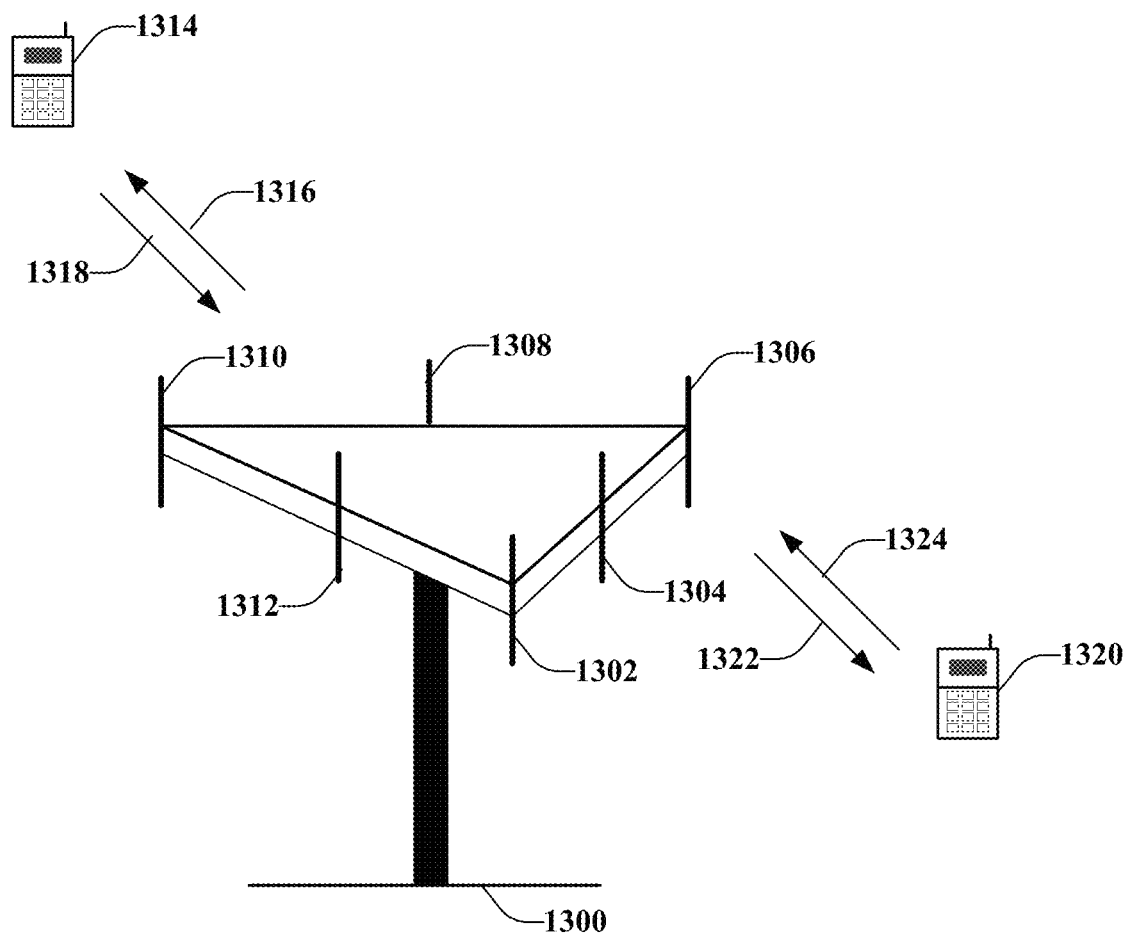
FIG. 13 illustrates a multiple access wireless communication system, in accordance with one or more embodiments described herein.

FIG. 13 illustrates a multiple access wireless communication system in accordance with one or more embodiments described herein. An access network 1300 (AN) includes multiple antenna groups, one including 1302 and 1304, another including 1306 and 1308, and an additional including 1310 and 1313. In FIG. 13, only two antennas illustrated for each antenna group, however, more or fewer antennas may be utilized for each antenna group. Access terminal 1314 (AT) is in communication with antennas 1310 and 1313, where antennas 1310 and 1312 transmit information to access terminal 1314 over forward link 1316 (e.g., DL) and receive information from access terminal 1314 over reverse link 1318 (e.g., UL). Access terminal (AT) 1316 is in communication with antennas 1304 and 1306, where antennas 1304 and 1306 transmit information to access terminal (AT) 1320 over forward link 1322 (e.g., DL) and receive information from access terminal (AT) 1320 over reverse link 1324 (e.g., UL). In a FDD system, communication links 1316, 1318, 1322, and 1324 may use different frequency for communication. For example, forward link 1316 may use a different frequency than that used by reverse link 1318.

Each group of antennas and/or the area in which they are designed to communicate is often referred to as a sector of the access network. In the embodiment, antenna groups each are designed to communicate to access terminals in a sector of the areas covered by access network 1300.

In communication over forward links 1316 and 1320, the transmitting antennas of access network 1300 may utilize beamforming in order to improve the signal-to-noise ratio of forward links for the different access terminals 1314 and 1320. Also, an access network using beamforming to transmit to access terminals scattered randomly through its coverage normally causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), a wireless communication device, terminal, access terminal or some other terminology.

Figure 14:
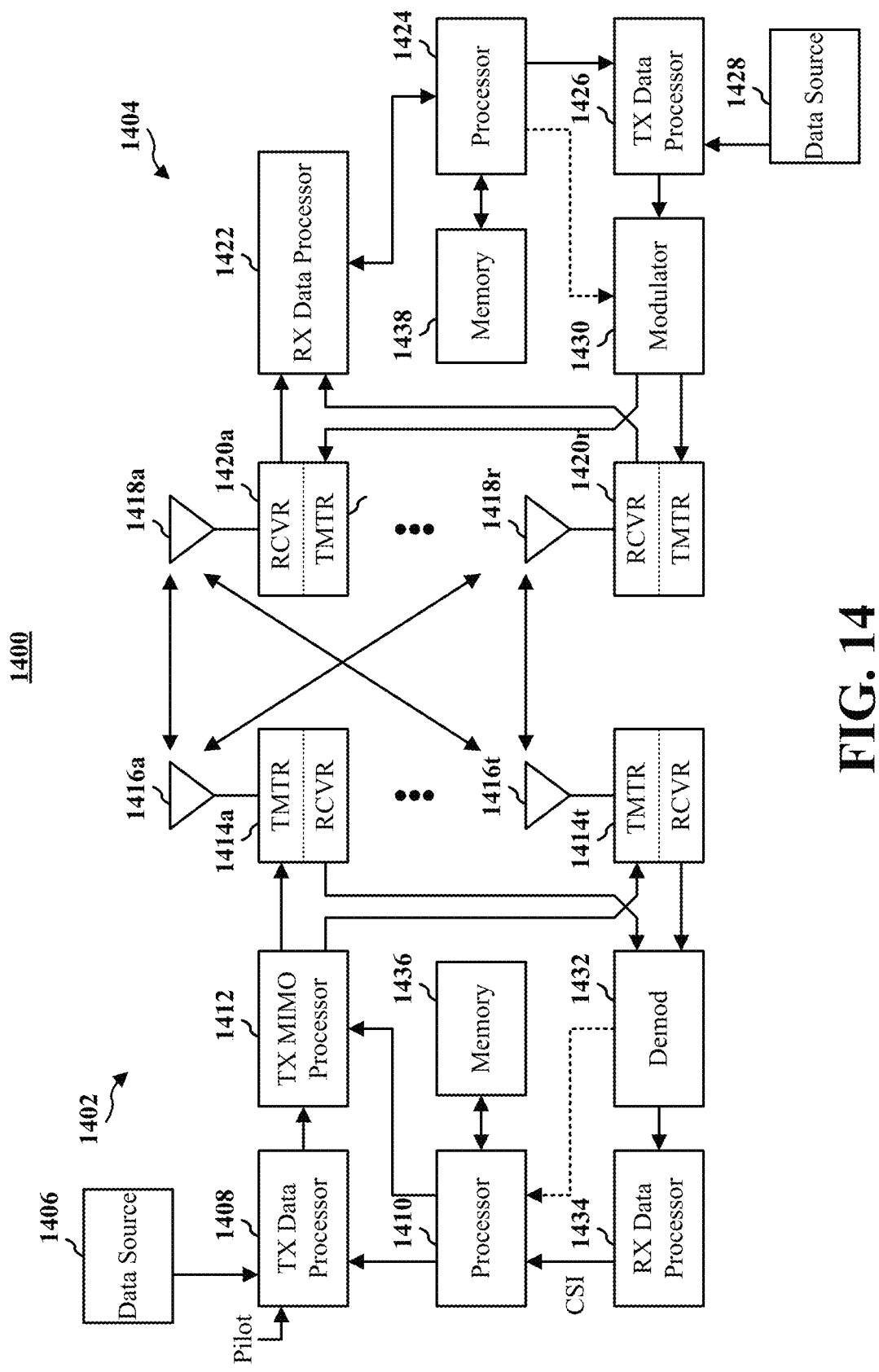
FIG. 14 illustrates a simplified block diagram of an embodiment a MIMO system that includes of a transmitter system and a receiver system, in accordance with one or more embodiments described herein.

FIG. 14 illustrates a simplified block diagram of an embodiment a MIMO system 1400 that includes of a transmitter system 1402 (also known as the access network) and a receiver system 1404 (also known as access terminal (AT) or user equipment (UE)) in accordance with one or more embodiments described herein. At the transmitter system 1402, traffic data for a number of data streams is provided from a data source 1406 to a transmit (TX) data processor 1408.

In one embodiment, each data stream is transmitted over a respective transmit antenna. TX data processor 1408 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 1410.

The modulation symbols for all data streams are then provided to a TX MIMO processor 1412, which may further process the modulation symbols (e.g., for OFDM). TX MIMO processor 1412 then provides $N_T$ modulation symbol streams to $N_T$ transmitters (TMTR) 1414a through 1414t. In certain embodiments, TX MIMO processor 1412 applies beamforming weights to the symbols of the data streams and to the antenna from which the symbol is being transmitted.

Each transmitter 1414 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 1414a through 1414t are then transmitted from $N_T$ antennas 1416a through 1416t, respectively.

At receiver system 1404, the transmitted modulated signals are received by $N_R$ antennas 1418a through 1418r and the received signal from each antenna 1418 is provided to a respective receiver (RCVR) 1420a through 1420r. Each receiver 1420 conditions (e.g., filters, amplifies, and downconverts) a respective received signal, digitizes the conditioned signal to provide samples, and further processes the samples to provide a corresponding "received" symbol stream.

An RX data processor 1422 then receives and processes the $N_R$ received symbol streams from $N_R$ receivers 1420 based on a particular receiver processing technique to provide $N_T$ "detected" symbol streams. The RX data processor 1422 then demodulates, deinterleaves, and decodes each detected symbol stream to recover the traffic data for the data stream. The processing by RX data processor 1422 is complementary to that performed by TX MIMO processor 1412 and TX data processor 1408 at transmitter system 1402.

A processor 1424 periodically determines which pre-coding matrix to use (discussed below). Processor 1424 formulates a reverse link message comprising a matrix index portion and a rank value portion.

The reverse link message may comprise various types of information regarding the communication link and/or the received data stream. The reverse link message is then processed by a TX data processor 1426, which also receives traffic data for a number of data streams from a data source 1428, modulated by a modulator 1430, conditioned by transmitters 1420a through 1420r, and transmitted back to transmitter system 1402.

At transmitter system 1402, the modulated signals from receiver system 1404 are received by antennas 1416, conditioned by receivers 1414, demodulated by a demodulator 1432, and processed by a RX data processor 1434 to extract the reserve link message transmitted by the receiver system 1404. Processor 1410 then determines which pre-coding matrix to use for determining the beamforming weights then processes the extracted message.

Memory 1436 can be used to temporarily store some buffered/computational data from 1432 or 1434 through processor 1430, store some buffed data from 1406, or store some specific program codes. Further, memory 1438 may be used to temporarily store some buffered/computational data from 1422 through processor 1424, store some buffered data from 1428, or store some specific program codes.

Figure 15:
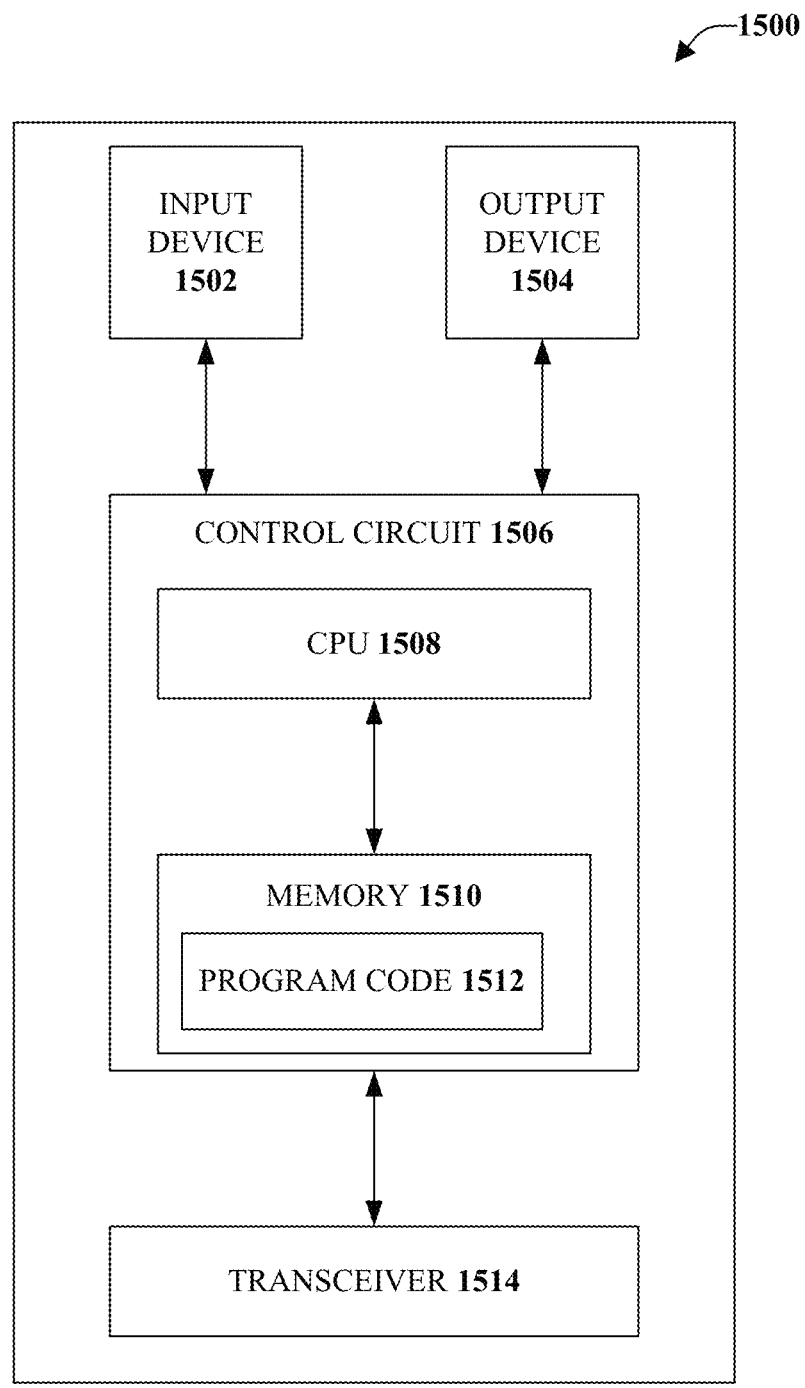
FIG. 15 illustrates an alternative simplified functional block diagram of a communication device, in accordance with one or more embodiments described herein.

Turning to FIG. 15, illustrated is an alternative simplified functional block diagram of a communication device 1500 in accordance with one or more embodiments described herein. As illustrated in FIG. 15, the communication device 1500 in a wireless communication system can be utilized for realizing the Mobile devices (or ATs) 1314 and 1320 in FIG. 13, and the wireless communications system can be the LTE system. The communication device 1500 can include an input device 1502, an output device 1504, a control circuit 1506, a central processing unit (CPU) 1508, a memory 1510, a program code 1512, and a transceiver 1514. The control circuit 1506 executes the program code 1512 in the memory 1510 through the CPU 1508, thereby controlling an operation of the communications device 1500. The program code can be executed to perform the techniques illustrated in FIGS. 3-12. The communications device 1500 can receive signals input by a user through the input device 1502, such as a keyboard or keypad, and can output images and sounds through the output device 1504, such as a monitor or speakers. The transceiver 1514 is used to receive and transmit wireless signals, delivering received signals to the control circuit 1506, and outputting signals generated by the control circuit 1506 wirelessly.

Figure 16:
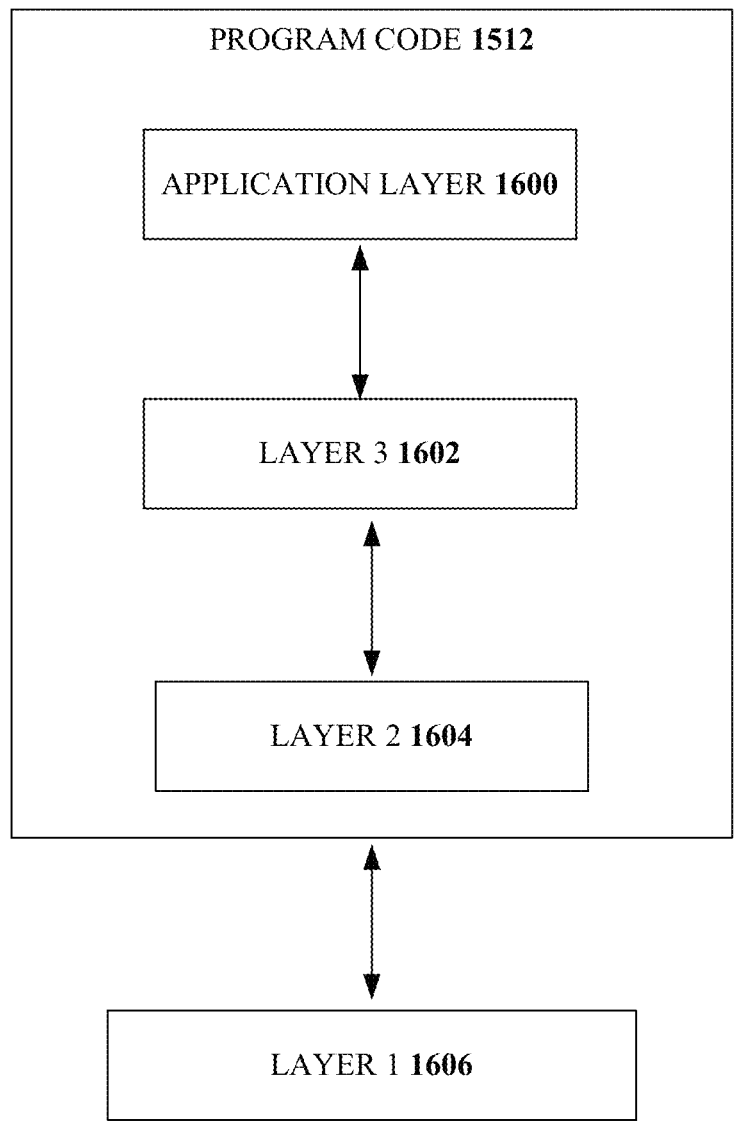
FIG. 16 is a simplified block diagram of the program code shown in FIG. 15, in accordance with one or more embodiments described herein.

FIG. 16 is a simplified block diagram of the program code 1512 shown in FIG. 15, in accordance with one or more embodiments described herein. In this embodiment, the program code 1512 includes an application layer 1600, a Layer 3 portion 1602, and a Layer 2 portion 1604, and is coupled to a Layer 1 portion 1606. The Layer 3 portion 1602 generally performs radio resource control. The Layer 2 portion 1604 generally performs link control. The Layer 1 portion 1606 generally performs physical connections. For LTE or LTE-A system, the Layer 2 portion 1604 may include a Radio Link Control (RLC) layer and a Medium Access Control (MAC) layer. The Layer 3 portion 1602 may include a Radio Resource Control (RRC) layer.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects, a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of ⅓ with rate matching. This design does not taken into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
configuring, by a user equipment (UE), use of a first numerology for receiving a control channel, wherein the control channel is indicative of a second numerology;
receiving, by the UE, information regarding using the second numerology for receiving a first data channel, wherein the control channel associated with the first numerology schedules the first data channel associated with the second numerology;
receiving, by the UE, the control channel by using the first numerology and receiving by the UE the first data channel by using the second numerology; and
receiving, by the UE, a second data channel by using the first numerology, wherein the control channel scheduling the second data channel is not indicative of the first numerology.

2. The method of claim 1, wherein the first numerology is a predefined numerology.

3. The method of claim 1, wherein the second data channel is a common data channel.

4. The method of claim 1, wherein the first data channel is for unicast data.

5. The method of claim 1, wherein the second data channel is a broadcast channel.

6. The method of claim 1, wherein the second numerology is configured by a radio resource control (RRC) message.

7. The method of claim 1, wherein the control channel and the first data channel are in a same cell.

8. The method of claim 1, comprising receiving, by the UE, information regarding using a third numerology for receiving a third data channel, wherein the first numerology is determined based upon the second numerology and the third numerology.

9. The method of claim 1, wherein the second numerology is different for different time intervals.

10. A method, comprising:
configuring, by a user equipment (UE), use of a first numerology for receiving a control channel, wherein the control channel is indicative of a second numerology;
receiving, by the UE, information regarding using the second numerology for transmitting a first data channel, wherein the control channel associated with the first numerology schedules the first data channel associated with the second numerology;
receiving, by the UE, the control channel by using the first numerology and transmitting by the UE the first data channel by using the second numerology; and
receiving, by the UE, a second data channel by using the first numerology, wherein the control channel scheduling the second data channel is not indicative of the first numerology.

11. The method of claim 10, wherein the second numerology is configured by a radio resource control (RRC) message.

12. The method of claim 10, comprising receiving, by the UE, information regarding using a third numerology for receiving a third data channel.

13. The method of claim 10, wherein the second data channel is a common data channel.

14. The method of claim 10, wherein the first data channel is for unicast data.

15. The method of claim 10, wherein the second data channel is a broadcast channel.

16. A method, comprising:
transmitting, to a first user equipment (UE), a first downlink (DL) data channel with a first numerology within a first bandwidth portion;
receiving, from the first UE, a hybrid automatic repeat request (HARQ) feedback by using a second numerology corresponding to data in the first DL data channel within a second bandwidth portion, wherein the second bandwidth portion is located in the first bandwidth portion;
transmitting, to a second UE, a second DL data channel with the first numerology within the first bandwidth portion; and
receiving, from the second UE, a HARQ feedback by using a third numerology corresponding to data in the second DL data channel within a third bandwidth portion.

17. The method of claim 16, wherein the first numerology and the second numerology are the same.

18. The method of claim 16, wherein the first numerology and the third numerology are different.

19. The method of claim 16, wherein the second bandwidth portion and the third bandwidth portion do not overlap.

20. The method of claim 16, wherein information regarding the first bandwidth portion and information regarding the third bandwidth portion are separately signaled.

* * * * *